(12) United States Patent
Tutunaru

(10) Patent No.: US 10,738,760 B2
(45) Date of Patent: Aug. 11, 2020

(54) VERTICAL AXIS WIND TURBINE

(71) Applicant: Catalin Tutunaru, Cape Elizabeth, ME (US)

(72) Inventor: Catalin Tutunaru, Cape Elizabeth, ME (US)

(*) Notice: Subject to any disclaimer, the term of this patent is extended or adjusted under 35 U.S.C. 154(b) by 232 days.

(21) Appl. No.: 15/561,306

(22) PCT Filed: Mar. 21, 2016

(86) PCT No.: PCT/US2016/023343
§ 371 (c)(1),
(2) Date: Sep. 25, 2017

(87) PCT Pub. No.: WO2016/154080
PCT Pub. Date: Sep. 29, 2016

(65) Prior Publication Data
US 2018/0100483 A1    Apr. 12, 2018

Related U.S. Application Data

(60) Provisional application No. 62/138,472, filed on Mar. 26, 2015.

(51) Int. Cl.
| F03D 3/04 | (2006.01) |
| F03D 1/06 | (2006.01) |
| F03D 3/00 | (2006.01) |
| F15D 1/00 | (2006.01) |
| F03D 9/25 | (2016.01) |

(52) U.S. Cl.
CPC ......... F03D 3/0463 (2013.01); F03D 1/0683 (2013.01); F03D 3/005 (2013.01); F03D 9/25 (2016.05); F15D 1/0005 (2013.01); *Y02E 10/721* (2013.01); *Y02E 10/74* (2013.01)

(58) Field of Classification Search
CPC ........ F03D 3/0463; F03D 9/25; F03D 1/0683; F03D 3/005; F15D 1/0005; Y02E 10/721; Y02E 10/74
See application file for complete search history.

(56) References Cited

U.S. PATENT DOCUMENTS

2007/0018462 A1*  1/2007  Richards ................. F03D 3/002
290/55

FOREIGN PATENT DOCUMENTS

WO    WO-2014105092 A2 *  7/2014  ............. B60K 16/00

* cited by examiner

*Primary Examiner* — Kenneth J Hansen
*Assistant Examiner* — Eric J Zamora Alvarez
(74) *Attorney, Agent, or Firm* — Law Offices of Daniel A. Tesler, LLC

(57) ABSTRACT

The present invention is a vertical axis wind turbine contained in a housing designed to introduce turbulent flow to increase efficiency. One embodiment of the invention uses a three bladed propeller with deflectors mounted upstream of the propeller to increase the pressure on the trailing edge of the blades. In another embodiment, an electric generator is coupled to the vertical axis wind turbine to convert the kinetic energy of a moving fluid into electricity.

7 Claims, 22 Drawing Sheets

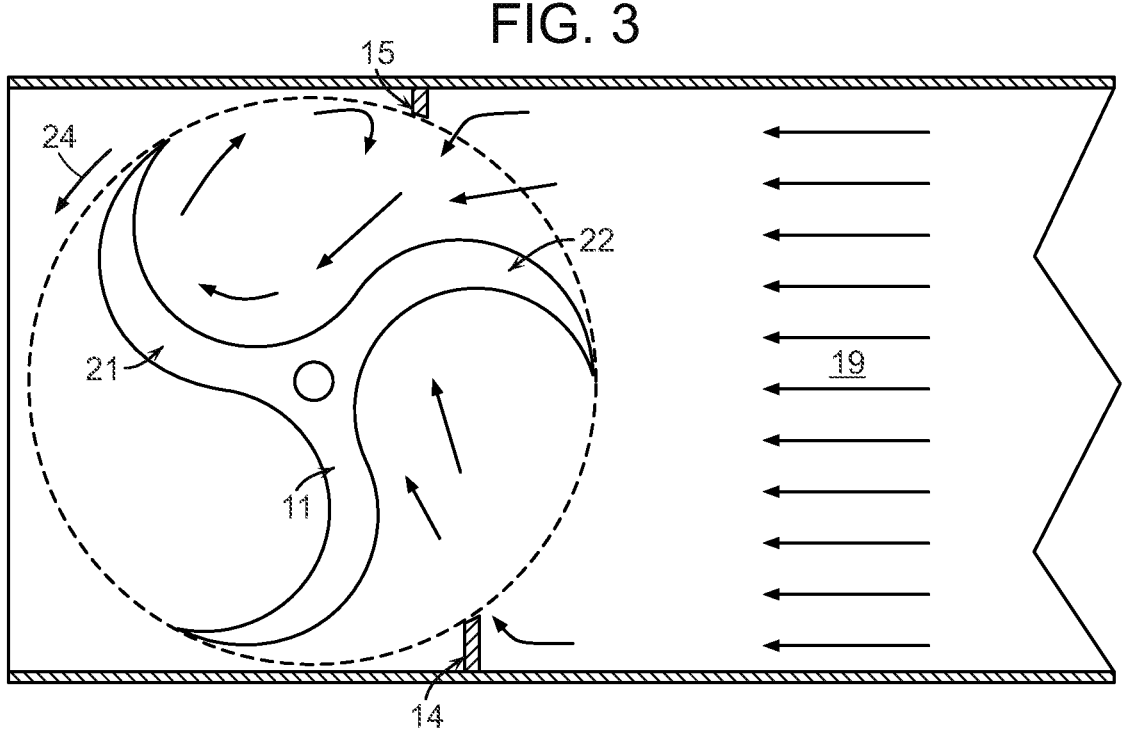
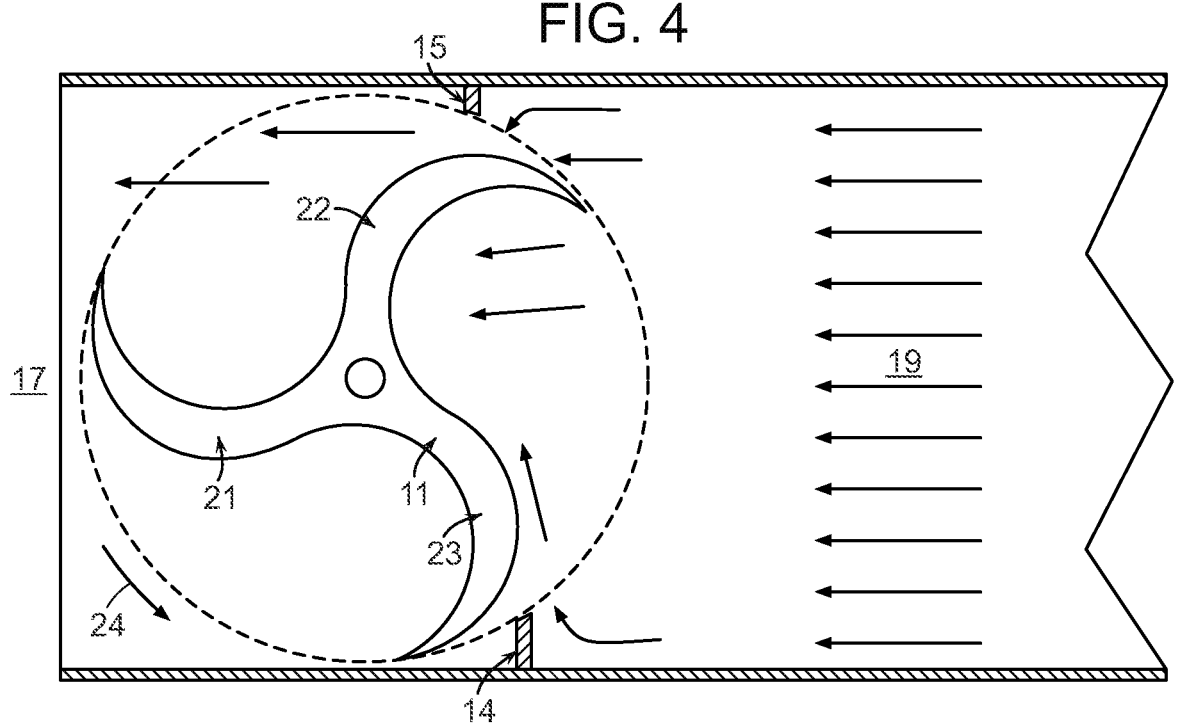

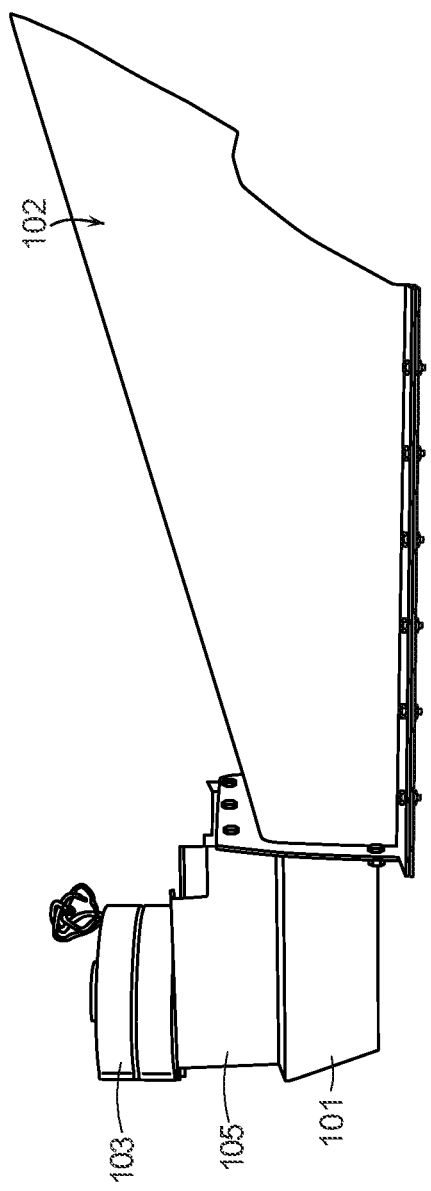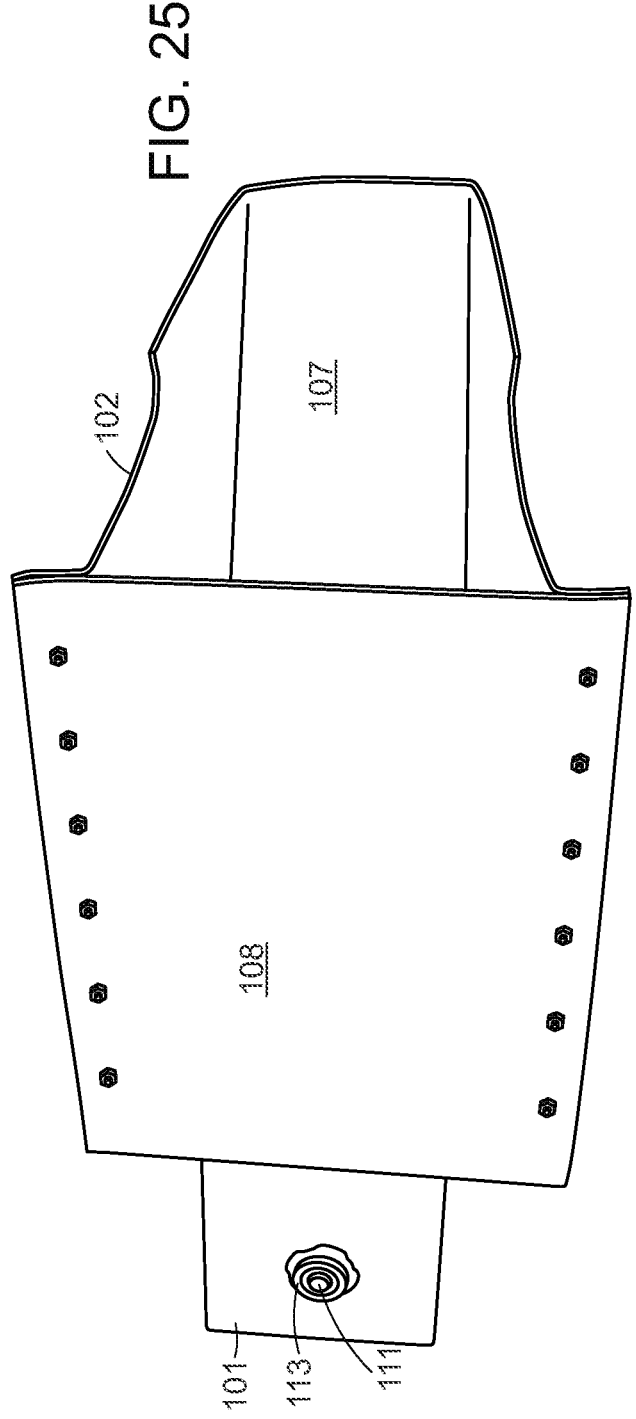

VERTICAL AXIS WIND TURBINE

CROSS REFERENCE TO RELATED APPLICATIONS

This application claims the benefit of U.S. Provisional Patent Application No. 62/138,472 filed Mar. 26, 2015, which is hereby incorporated by reference in its entirety.

FIELD OF THE INVENTION

The present invention relates to energy generation, in particular, to wind turbines.

BACKGROUND OF THE INVENTION

In recent years, there has been a significant amount of effort expended to convert the energy from moving air and other fluids into electricity. In particular, various types of wind powered generators and water powered generators designs are in the prior art. Despite the recent development in wind and water powered generators, the existing designs are bulky or inefficient and incapable of providing a compact and efficient generator.

In general, most electrical generators in the prior art use a propeller placed in a moving fluid and fixed to a rotating shaft, where the rotating shaft is coupled to the input shaft of an electric generator. In operation, the moving fluid causes the propeller and shaft assembly to rotate, which in turn causes the input shaft of the electric generator to rotate and generate electricity.

An efficient generator blade design in the prior art uses a horizontal axis propeller with a plurality of blades radiating from a central hub using the Bernoulli principle. While this type of generator blade can efficiently convert the movement of a fluid into electricity, it is a bulky design and is best suited for applications where space is not a significant consideration. When a Bernoulli propeller is scaled down to fit in smaller applications, the limiting factor of its efficiency is the size of the output shaft running in the direction of the horizontal axis, which must support the propeller and transmit the rotational force produced by the propeller to a generator. As the application becomes smaller, the size of the output shaft must necessarily become larger in proportion to the length of the propeller blades, causing a reduction of efficiency.

Other wind generators in the prior art have used a savonius type vertical axis propeller to convert the movement of a fluid into electricity. In a savonius type propeller, there are two or more blades or cups with a leading edge facing the direction of rotation and a trailing edge facing in the opposite direction. The savonius type blade is compact in size, however, when used alone, the force of the moving fluid pushes the trailing edge of one or more blades in the direction of rotation while simultaneously pushing the leading edge of one or more blades in the opposite direction. Designs in the prior art have attempted to overcome this inefficiency by using deflectors to smoothly direct airflow away from the leading edge of each blade and toward only the trailing edge of the blades. These designs seek to optimize the efficiency of the savonius type blade by using a tube or baffle designed with the Venturi effect to increase the speed of the fluid as it contacts the trailing edge of the blades, while maintaining laminar flow. While the Venturi effect tubes and baffles in the prior art increase the efficiency of the savonius type propeller, they are still inefficient when compared to the efficiency of a Bernoulli type propeller.

There are many current applications that would benefit from an efficient and compact generator capable of converting the motion of a fluid into electricity. For example, electric vehicles would benefit from a compact and efficient wind powered generator to convert the air flow around the vehicle into electricity. Accordingly, it is an object of the present invention to provide a compact and efficient generator capable of converting the motion of a fluid into electricity.

BRIEF SUMMARY OF THE INVENTION

The present invention provides an efficient and compact vertical axis wind turbine using a multi-bladed propeller in a housing with deflectors or baffles designed to introduce turbulent flow. The turbulent flow introduced by the deflectors increases the air pressure exerted on the trailing edge of the propeller blades while also reducing the amount of drag exerted on the leading edge of the blades. When turbulent flow is introduced ahead of the propeller, the air pressure on the trailing edge of the blades is increased by 20 times over a propeller without deflectors to introduce the turbulent flow.

The prior art teaches away from the present invention's use of deflectors or baffles to introduce turbulent flow as a method of increasing the efficiency of a vertical axis propeller. The prior art teaches the importance of maintaining laminar flow on the trailing edge of the blades and most commonly uses the Venturi effect to increase the speed of the incoming air while avoiding turbulence. Instead, the present invention intentionally introduces turbulent flow ahead of specially designed propeller blades to increase the air pressure on the trailing edge of the blades.

The present invention can be coupled to an electric generator to convert the kinetic energy of a moving fluid into electricity. The embodiments presented in this application are optimized for use in a moving stream of air, however, it is appreciated that the invention could be used in other types of fluids within the inventive concept expressed herein.

BRIEF DESCRIPTION OF THE SEVERAL VIEWS OF THE DRAWINGS

FIG. 3 is a sectioned top view of the first embodiment of the invention with the propeller in a third position.

FIG. 4 is a sectioned top view of the first embodiment of the invention with the propeller in a fourth position.

FIG. 24 is a side view of the second embodiment of the invention.

FIG. 25 is a bottom view of the second embodiment of the invention.

DETAILED DESCRIPTION OF THE INVENTION

Figure 1:
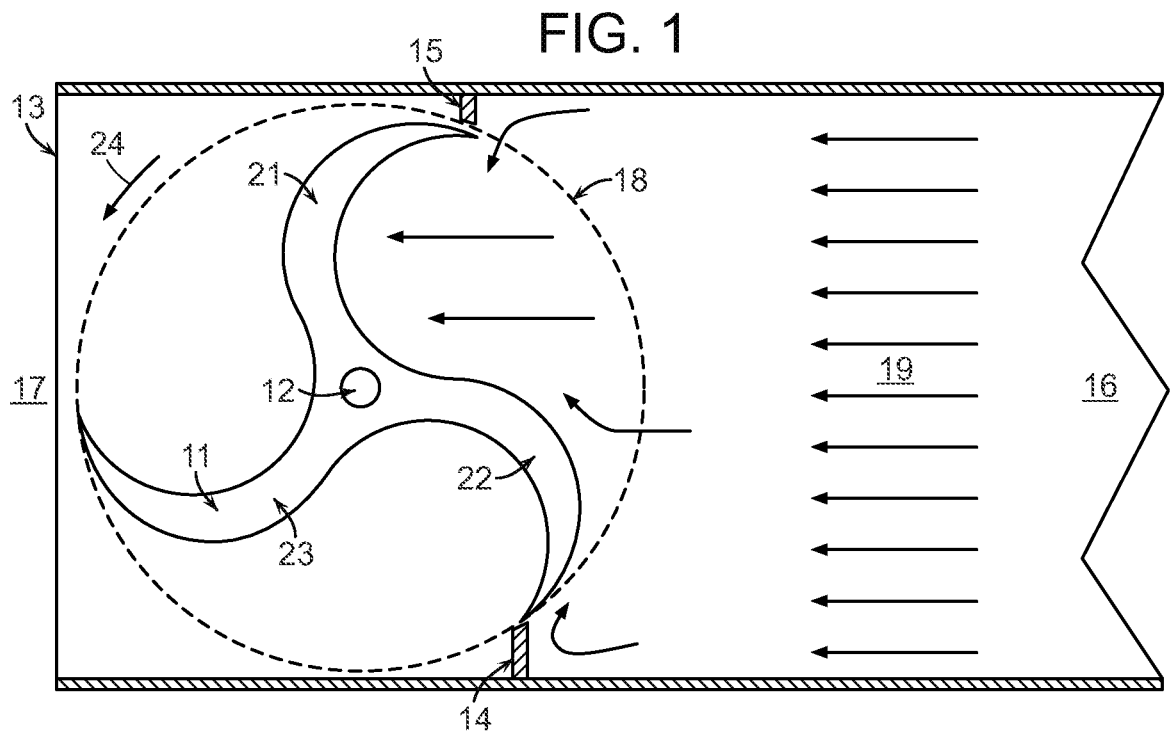
FIG. 1 is a sectioned top view of a first embodiment of the invention with the propeller in a first position.

In FIG. 1 is a sectioned top view of a first embodiment of the invention comprising a propeller 11 in a first position, rotating about a vertical axis 12 and within a housing 13. The vertical axis 12 connects to an electrical generator not shown in this view. Within the housing 13 is a first deflector 14 and a second deflector 15. When the propeller 11 rotates about axis 12, circle 18 represents the path of the propeller tips through a full rotation of the propeller. The edges of the first deflector 14 and the second deflector 15 closest to circle 18 are parallel to a line tangent to the point on circle 18 closest to the tip of the respective deflector. The edges of the first deflector 14 and second deflector 15 are 0.5 mm away from said tangent lines in the first embodiment, however, where tolerances allow, a smaller clearance is preferable.

The propeller 11 is a three bladed design in the first embodiment with a first blade 21, second blade 22 and third blade 23. The propeller 11 rotates in direction 24 (counter-clockwise when viewed from above) where the face of each blade in the direction of rotation is the leading edge and the face of each blade away from the direction of rotation is the trailing edge.

While the present invention can be used in many different types of moving fluids with minimal modification within the inventive concept, the preferred embodiment is optimized for use in a stream of air moving at approximately 35 mph. When using this fluid type and speed, a three bladed propeller is the most efficient design when considering aerodynamic drag and shaft torque. At lower speeds or denser fluids, a two bladed propeller can be more efficient. At higher speeds or lighter fluids, a multi-bladed propeller with more than three blades can be more efficient.

The housing 13 is designed to be placed in a moving fluid where the fluid enters through a first open end 16. The fluid passes through the housing 13 and exits through a second open end 17. The arrows 19 represent the direction of flow as the fluid enters the housing 13.

In FIG. 1, the propeller 11 is in a first position characterized by the tip of the first blade 21 being even with the leading edge of deflector 15 closest to the first open end 16. When the tip of first blade 21 is in the said position, the tip of the second blade 22 is even with trailing edge of deflector 14 closest to the second open end 17. The tips of each blade on propeller 11 are 120 degrees apart. In the first embodiment, the length of deflector 14 is approximately two times the length of deflector 15 (when measured in the direction normal to the direction of flow 19).

In the first embodiment, the deflectors 14 and 15 are normal to the direction of flow 19 to optimize the invention for a stream of air moving at 35 mph. To optimize the invention for a faster stream of air, the deflectors 14 would need to be angled away from the direction of flow 19 while maintaining the position of the tips of the deflectors relative to tips of the first blade 21 and second blade 22 when the propeller 11 is in the first position. When using the propeller of the first embodiment in a fluid with a lighter density than air, the deflectors 14 and 15 would need to be angled away from the direction of flow 19 at a higher fluid velocity than required when air is the fluid. Conversely, a denser fluid would necessitate angling the deflectors 14 and 15 away from the direction of flow 19 at a lower fluid velocity than required when air is the fluid.

When the propeller 11 is in the first position, the air is redirected by deflectors 14 and 15 towards the trailing edge of the first blade 21. The leading edge of the second blade 22 also serves to direct some of the air towards the trailing edge of the first blade 21.

Figure 2:
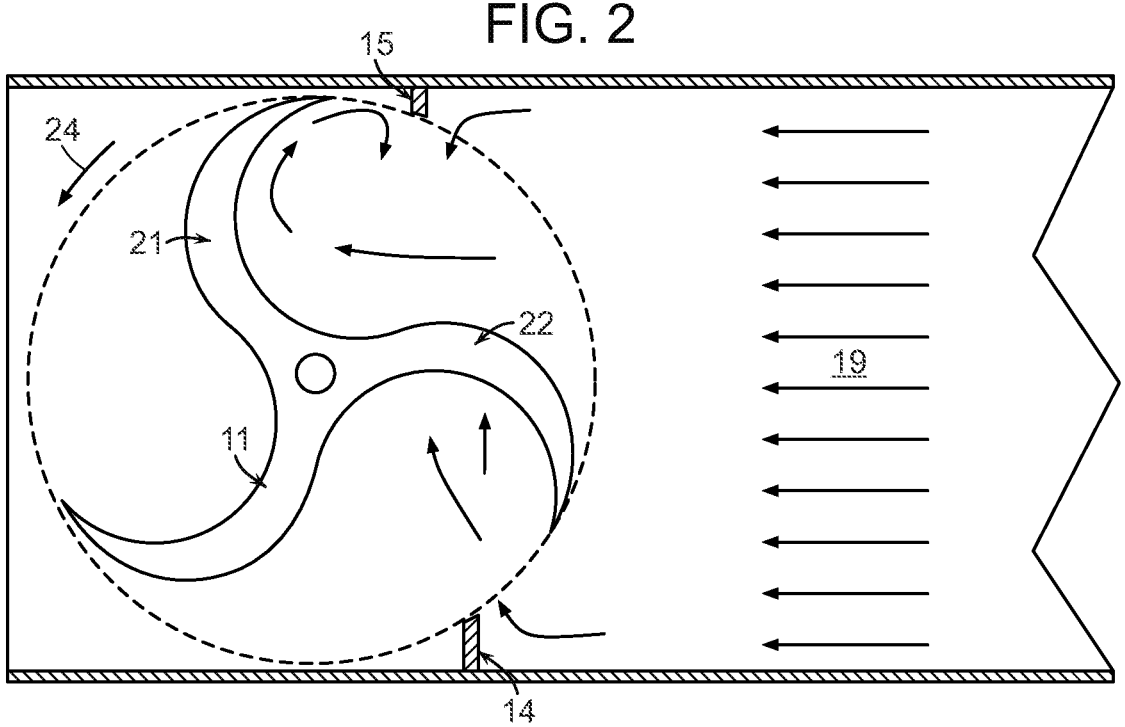
FIG. 2 is a sectioned top view of the first embodiment of the invention with the propeller in a second position.

In FIG. 2, the propeller 11 is in a second position where the propeller 11 has rotated approximately 30 degrees in the direction of rotation 24. In the second position, the deflector 15 continues to redirect air towards the trailing edge of the first blade 21. Moving air from the flow 19 also pushes against the trailing edge of the first blade 21 as well as air deflected by the leading edge of the second blade. Air directed to the trailing edge of the first blade 21 moves along the face of the blade and is shed from the tip of the blade in the direction of the backside of deflector 15. The air contacting the backside of deflector 15 is redirected towards the center of the trailing edge of the first blade 21. The swirling effect of the air being shed from the tip of the first blade 21 and redirected towards the trailing edge of the same blade generates a turbulent flow that increases the air pressure on the trailing edge of the first blade 21 to twenty times the air pressure found in a laminar flow deflector design. The deflector 14 also continues to redirect air towards the propeller 11, but in the second position, the air is directed towards the trailing edge of the second blade 22.

In FIG. 3, the propeller 11 is in a third position where the propeller 11 has rotated approximately 30 degrees in the direction of rotation 24 from the second position. In the third position, the deflector 15 continues to redirect air towards the trailing edge of the first blade 21. Some moving air from the flow 19 continues to push against the trailing edge of the first blade 21. Air is also deflected by the leading edge of the second blade 22 towards the trailing edge of the first blade 21. Air directed to the trailing edge of the first blade 21 moves along the face of the blade and is shed from the tip of the blade in the direction of the backside of deflector 15 in a larger diameter vortex than in the second position. The air contacting the backside of deflector 15 is redirected towards the center of the trailing edge of the first blade 21, continuing to generate the turbulent flow as in the second position. The deflector 14 also continues to redirect air towards the trailing edge of the second blade 22.

In FIG. 4, the propeller 11 is in a fourth position where the propeller 11 has rotated approximately 30 degrees in the direction of rotation 24 from the third position. In the fourth position, the deflector 15 redirects air past the first blade 21 and out the second open end 17. The moving air from the flow 19 pushes against the trailing edge of the second blade 22. The deflector 14 redirects air towards the leading edge of the third blade 23, which runs along the leading edge and continues towards the trailing edge of the second blade 22. When the propeller 11 rotates an additional 30 degrees from the fourth position in the direction of rotation 24, the propeller will be in substantially the same position as the first position shown in FIG. 1.

Figure 5:
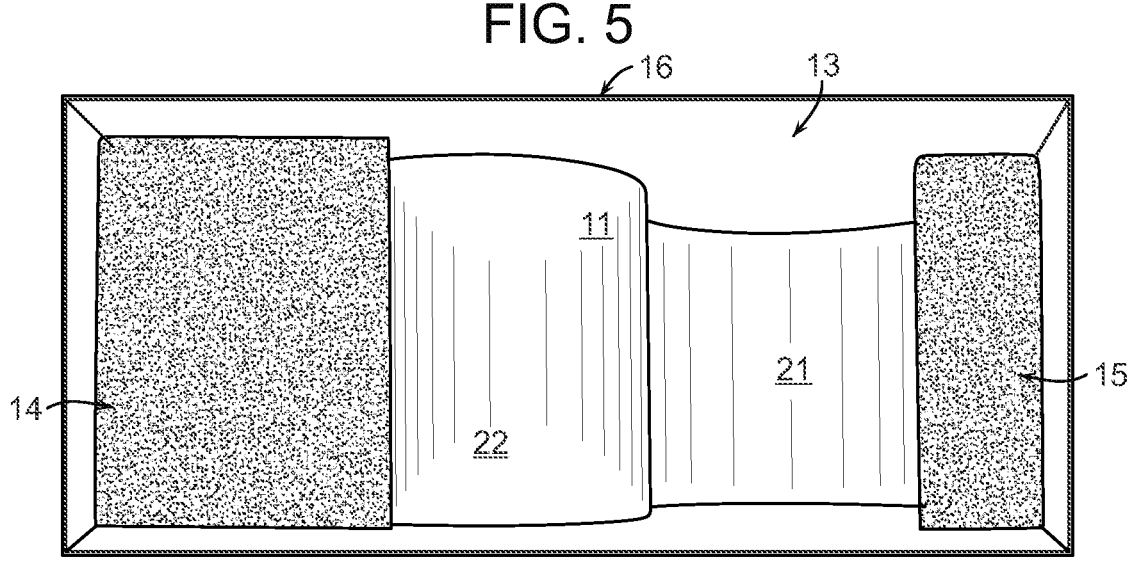
FIG. 5 is a front view of the first embodiment of the invention.
Figure 6:
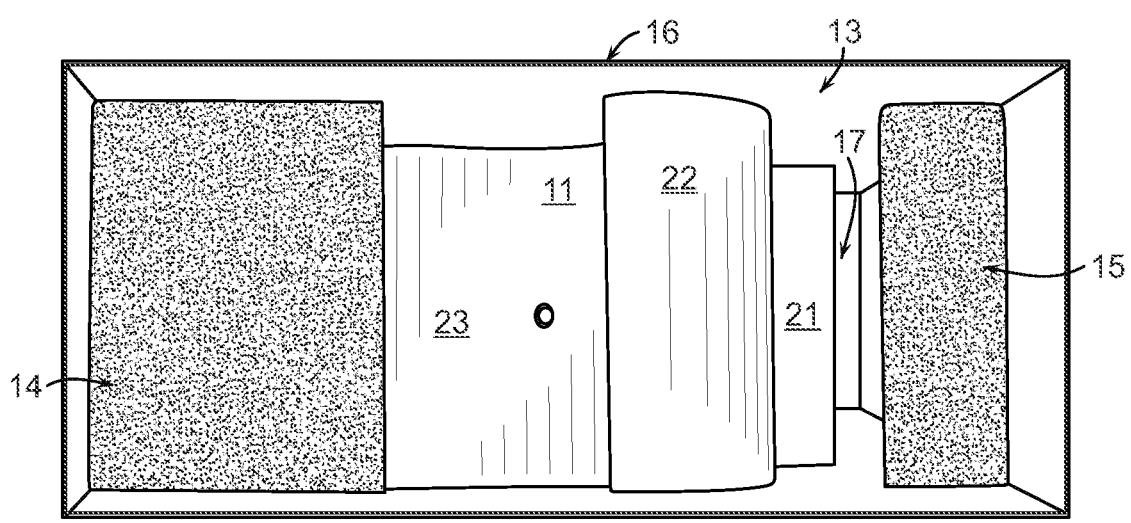
FIG. 6 is a front view of the first embodiment of the invention with the propeller in an alternate position.

In FIGS. 5 and 6 are front views of the invention viewed from the first open end 16 of housing 13. In FIGS. 5 and 6, the first deflector 14 and second deflector 15 can be seen in front of the propeller 11. In FIG. 5, the propeller 11 is placed in substantially the same position as the first position shown in FIG. 1 where the trailing edge of the first blade 21 and the leading edge of the second blade 22 are visible. In FIG. 6, the propeller 11 has been rotated counterclockwise (when viewed from above) approximated 60 degrees to substantially the same position as the third position shown in FIG. 3 where the trailing edge of the first blade 21, the leading edge of the second blade 22 and the leading edge of the third blade 23 are visible. Also visible past the first blade 21 is the exit 17 of the housing 13.

FIGS. 7-20 are a selection of results from a wind tunnel simulation conducted on a two bladed vertical axis propeller to explore and show the advantages of the present invention. The wind tunnel simulation conducted in the development of the present invention used a vertical axis propeller consisting of two blades positioned 180 degrees apart, each with a concave and convex surface. For each point of data taken, the wind tunnel simulation was conducted on a housing without deflectors ahead of the propeller and with deflectors ahead of the propeller. While the geometry of the deflectors and the propeller design in the first embodiment are modified from the designed used in the simulation, the wind tunnel simulation confirms the advantages of the inventive concept expressed herein and served as a basis for the development that resulted in the first embodiment.

Figure 7:
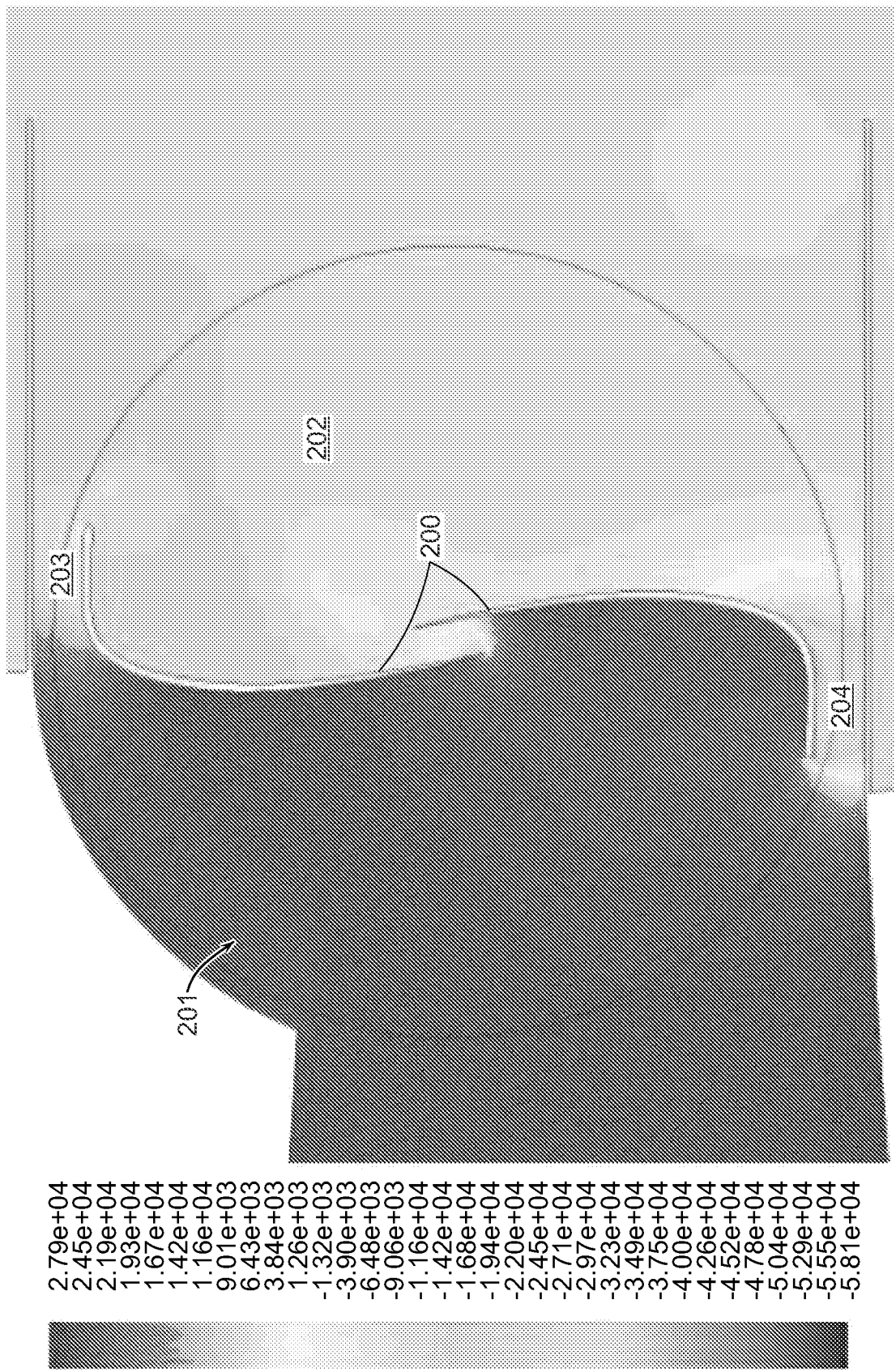
FIG. 7 is a static air pressure wind tunnel study of a housing without deflectors and a propeller in position "a."
Figure 8:
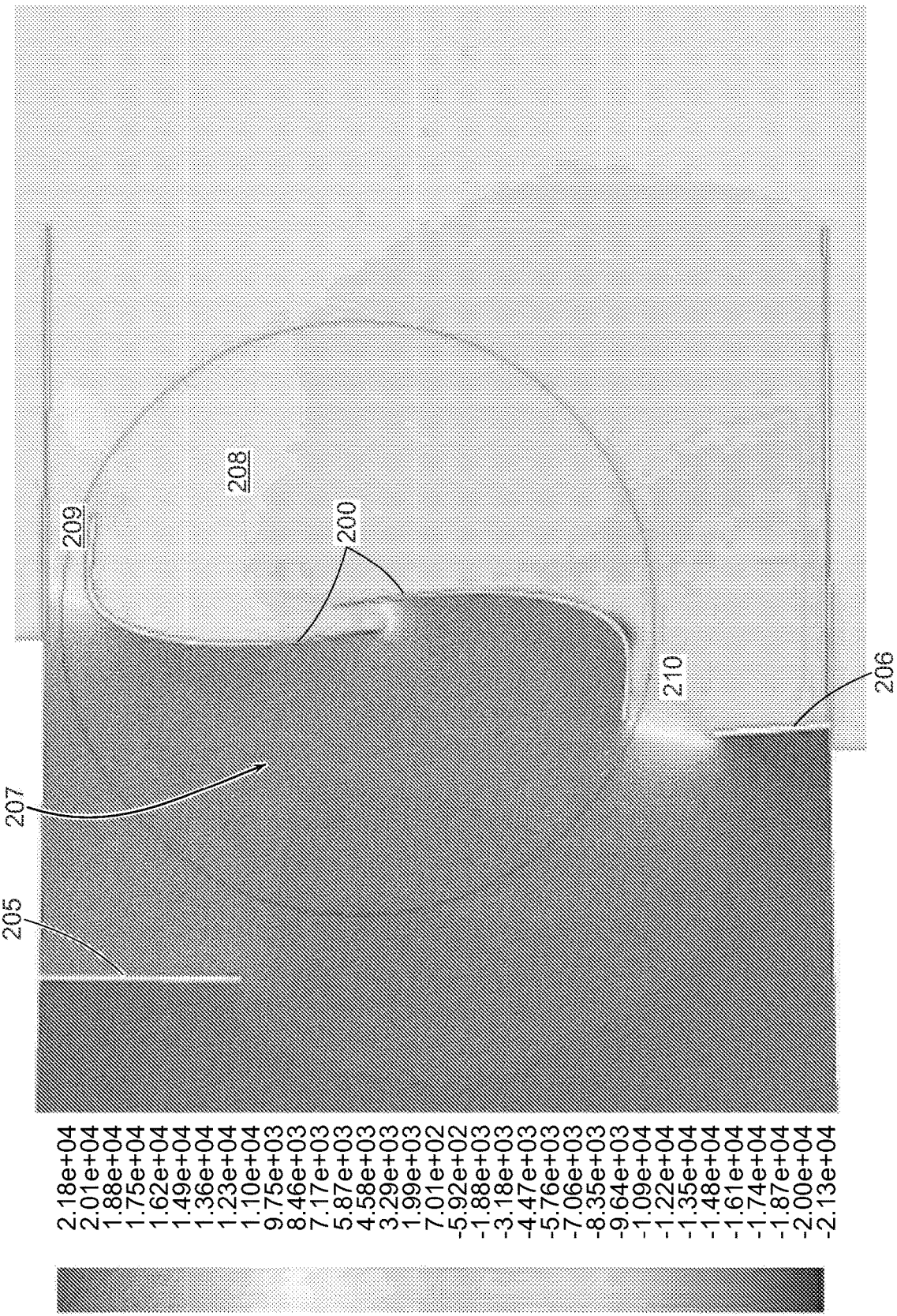
FIG. 8 is a static air pressure wind tunnel study of a housing with deflectors and a propeller in position "a."

FIG. 7 shows the distribution of pressure where air moving at 36-40 mph is directed towards a stationary propeller 200 in position "a" in a housing without deflectors. FIG. 8 shows the distribution of pressure under the same conditions as FIG. 7, but with deflectors 205 and 206 in the housing ahead of the propeller 200. The scales on the left side of FIGS. 7 and 8 are in pounds per square inch.

In FIG. 7, the housing without deflectors creates an area of high pressure 201 on the propeller 200 and an area of low pressure 202. Close to the walls of the housing are areas of intermediate pressure 203 and 204. In FIG. 8, when the deflectors 205 and 206 are added, the pressure differential between the high pressure area 207 and the low pressure area 208 is greater than the pressure differential between the high pressure area 201 and the low pressure 202 in FIG. 7. In addition, the intermediate pressure zones 209 and 210 have a lower pressure than the intermediate pressure areas 203 and 204 in FIG. 7, reducing the air resistance against the propeller 200 when rotating in the counter-clockwise direction.

Figure 9:
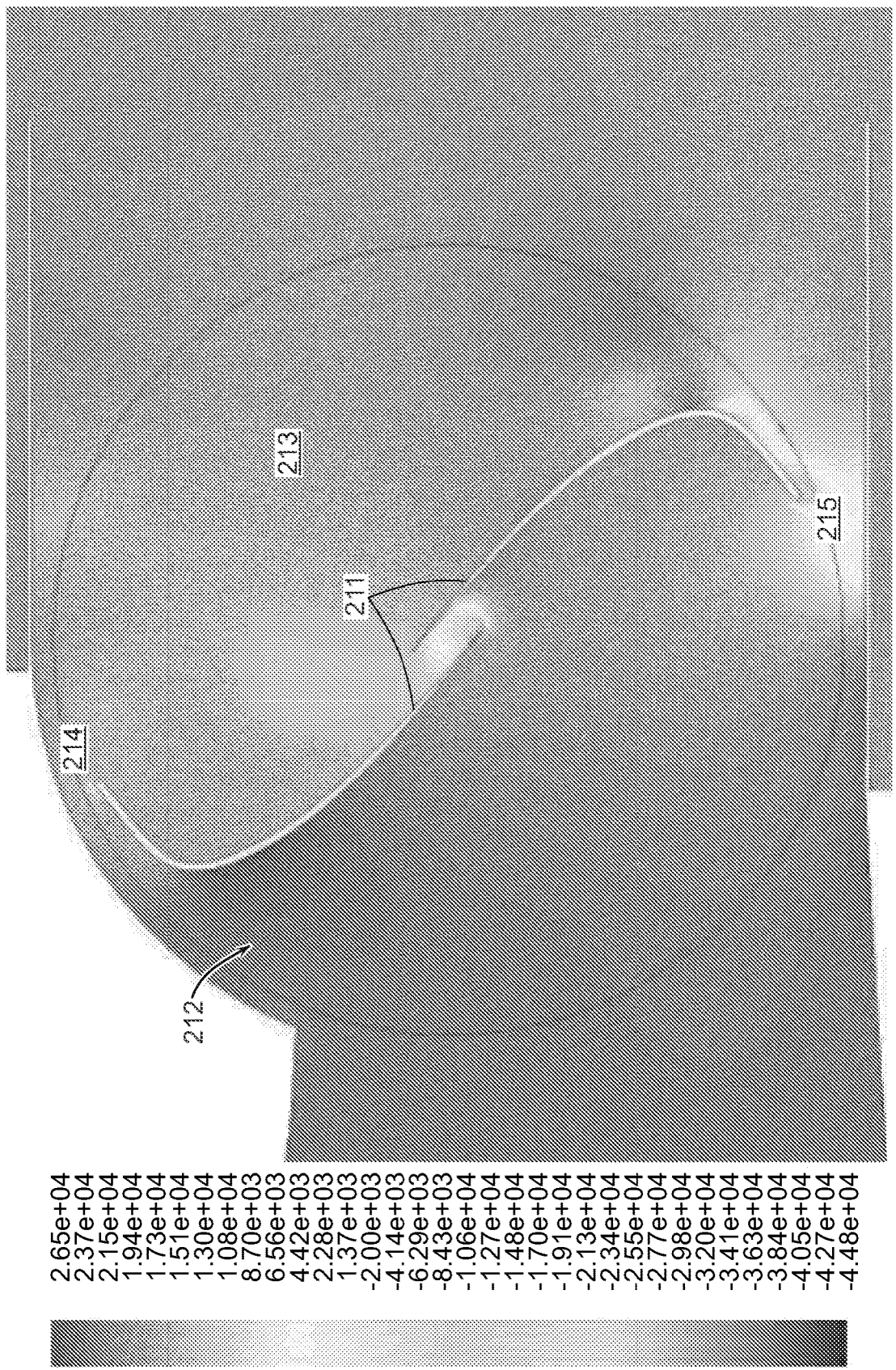
FIG. 9 is a static air pressure wind tunnel study of a housing without deflectors and a propeller in position "b."
Figure 10:
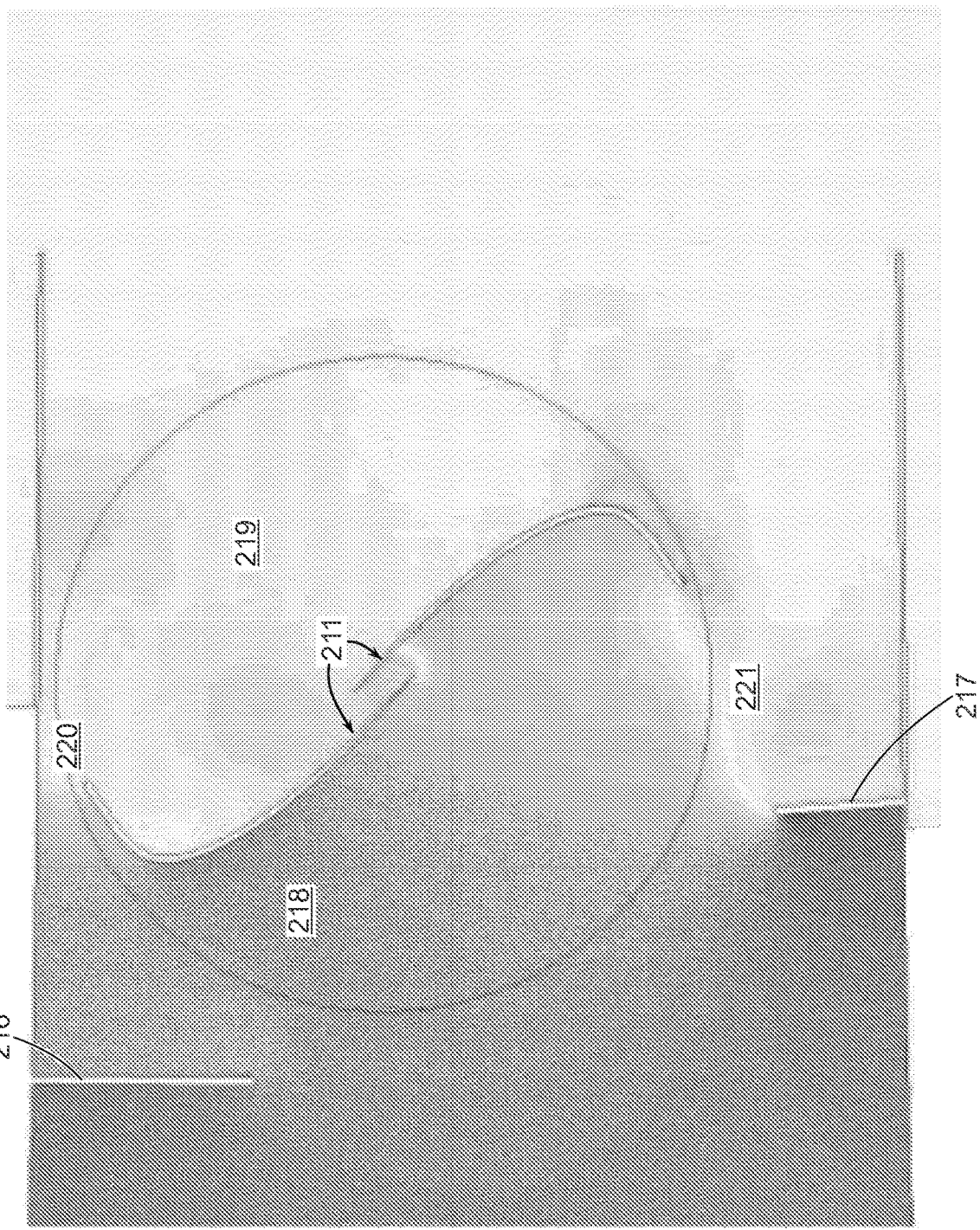
FIG. 10 is a static air pressure wind tunnel study of a housing with deflectors and a propeller in position "b."

FIG. 9 shows the distribution of pressure where air moving at 36-40 mph is directed towards a stationary propeller in position "b" in a housing without deflectors. In position "b," the propeller 211 has been rotated counterclockwise by 45 degrees from position "a" shown in FIGS. 7 and 8. FIG. 10 shows the distribution of pressure under the same conditions as FIG. 9, but with deflectors 216 and 217 in the housing ahead of the propeller 211. The scales on the left side of FIGS. 9 and 10 are in pounds per square inch.

In FIG. 9, the housing without deflectors creates an area of high pressure 212 on the propeller 211 and an area of low pressure 213. Close to the walls of the housing are areas of intermediate pressure 214 and 215. In FIG. 10, the addition of the deflectors 216 and 217 has a similar effect as in position "a." With the deflectors 216 and 217, the pressure differential between the high pressure area 218 and the low pressure area 219 is greater than the pressure differential between the high pressure area 212 and the low pressure 213 in FIG. 9. In addition, the intermediate pressure zones 220 and 221 have a lower pressure than the intermediate pressure areas 214 and 215 in FIG. 9, reducing the air resistance against the propeller 211 when rotating in the counter-clockwise direction.

Figure 11:
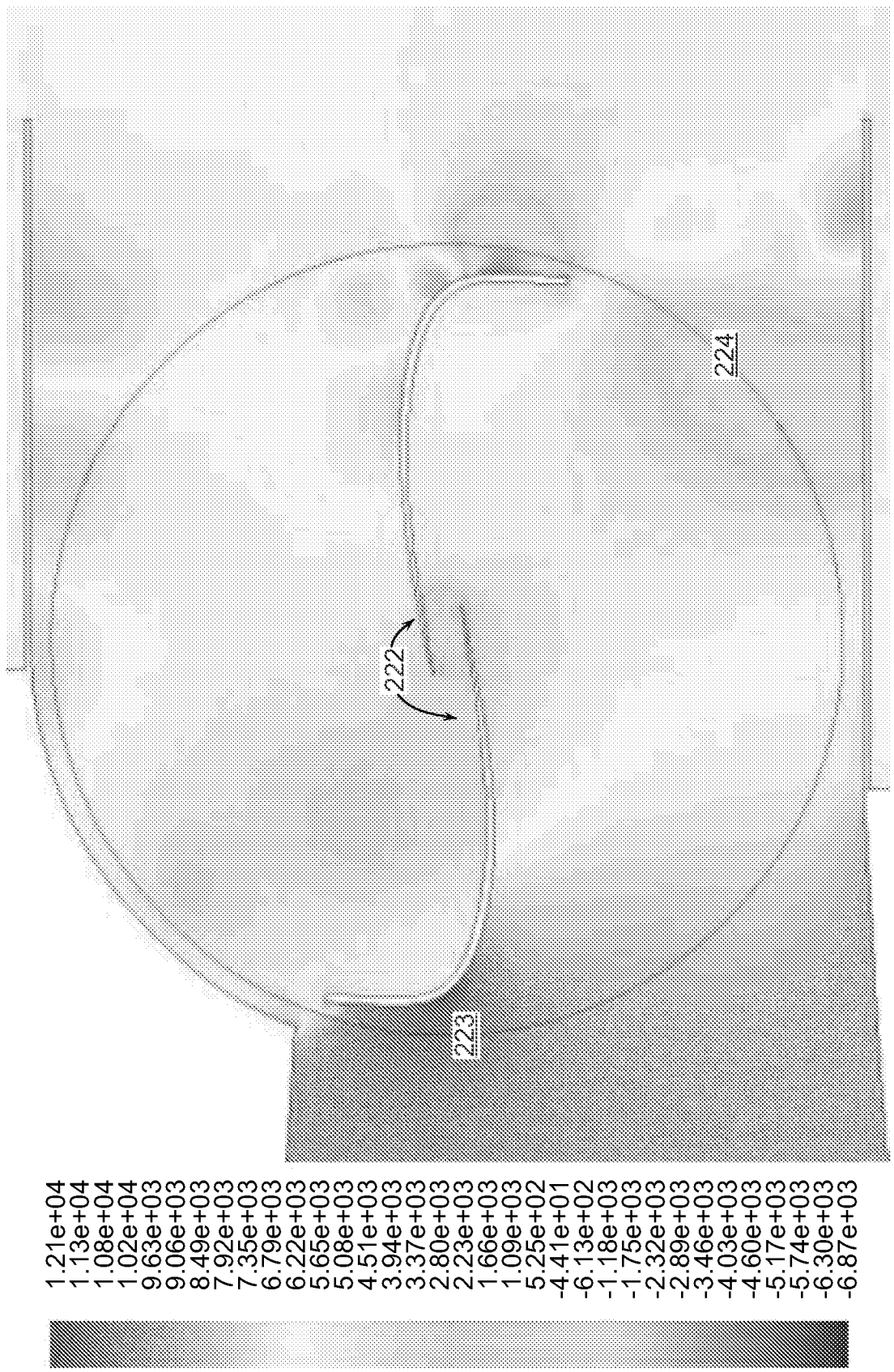
FIG. 11 is a static air pressure wind tunnel study of a housing without deflectors and a propeller in position "c."
Figure 12:
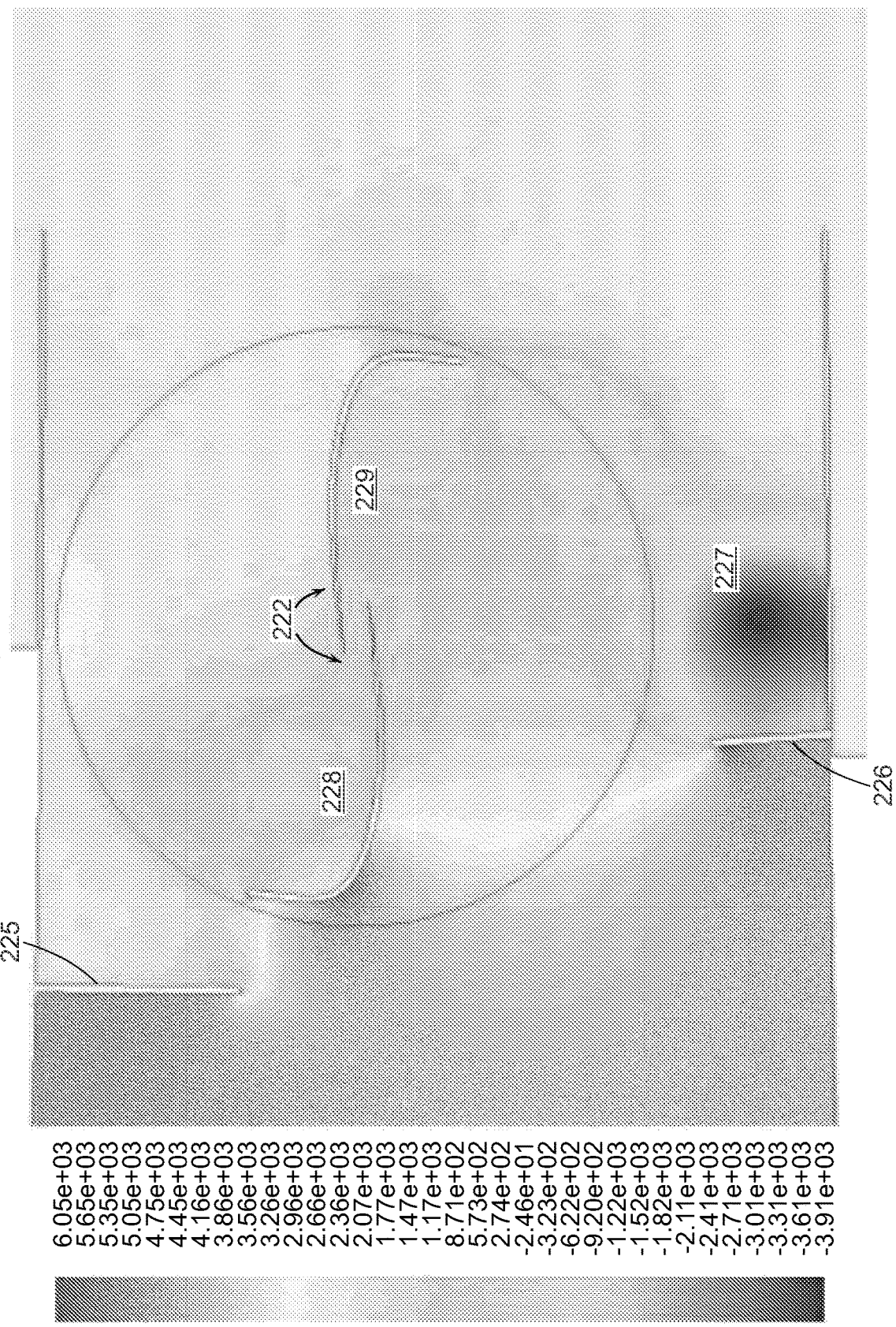
FIG. 12 is a static air pressure wind tunnel study of a housing with deflectors and a propeller in position "c."

FIG. 11 shows the distribution of pressure where air moving at 36-40 mph is directed towards a stationary propeller 222 in position "c" in a housing without deflectors. In position "c," the propeller 222 has been rotated counterclockwise by 45 degrees from position "b" shown in FIGS. 9 and 10. FIG. 12 shows the distribution of pressure under the same conditions as FIG. 11, but with deflectors 225 and 226 in the housing ahead of the propeller 222. The scales on the left side of FIGS. 11 and 12 are in pounds per square inch.

In FIG. 11, without deflectors, an area of high pressure 223 develops ahead of the propeller 222 resisting its rotation in the counterclockwise direction. An area of high pressure 224 develops behind the other blade of the propeller 222, but is not directed towards the blade and moves past the blade without translating into a significant rotational force. In FIG. 12, with the addition of baffles 225 and 226, the pressure is higher and more evenly distributed on the faces of the propeller 222 blades in areas 228 and 229. An area of high pressure also develops in area 227 that is directed towards the face of a propeller blade to create a rotational force in the counterclockwise direction.

Figure 13:
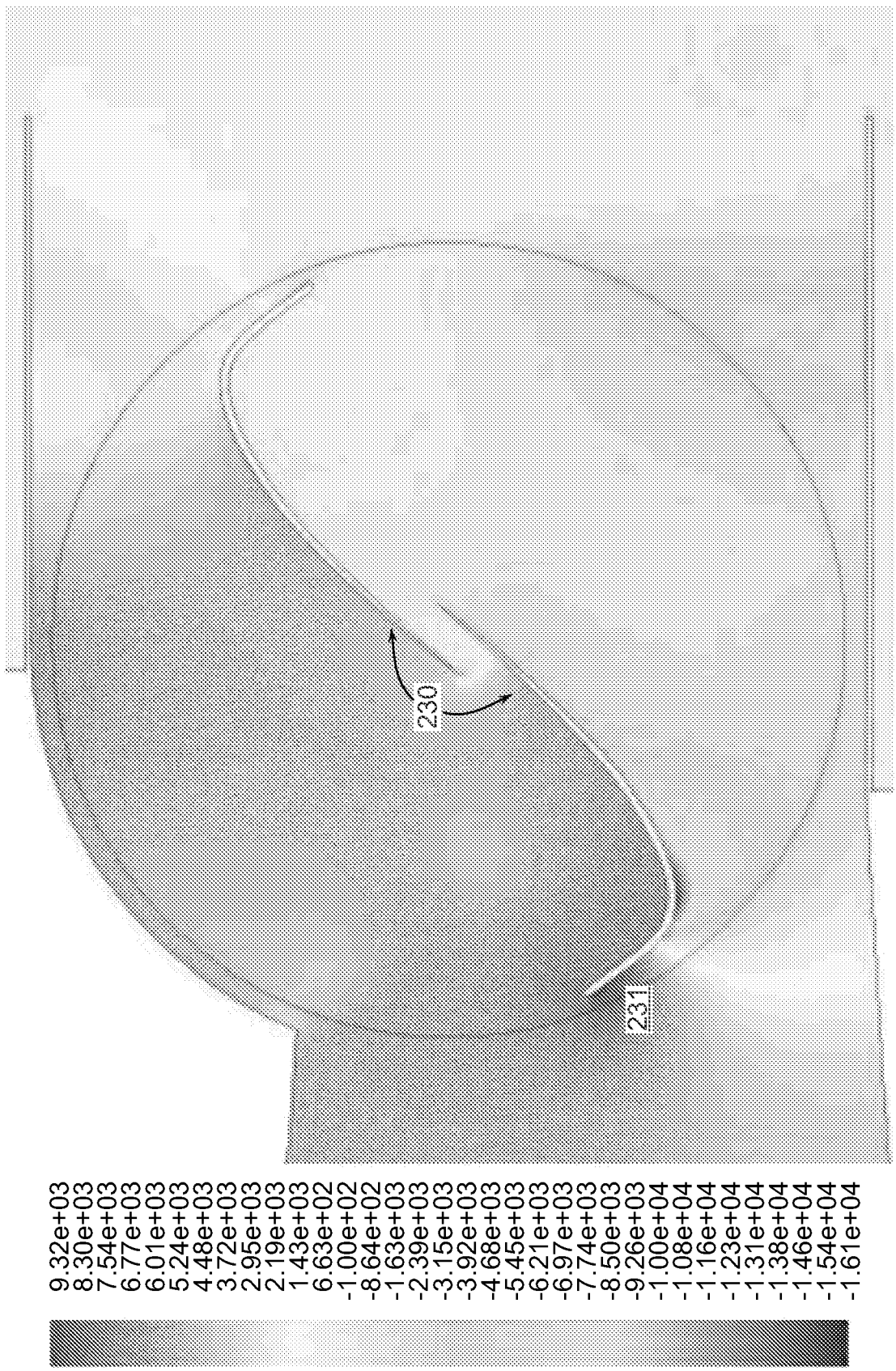
FIG. 13 is a static air pressure wind tunnel study of a housing without deflectors and a propeller in position "d."
Figure 14:
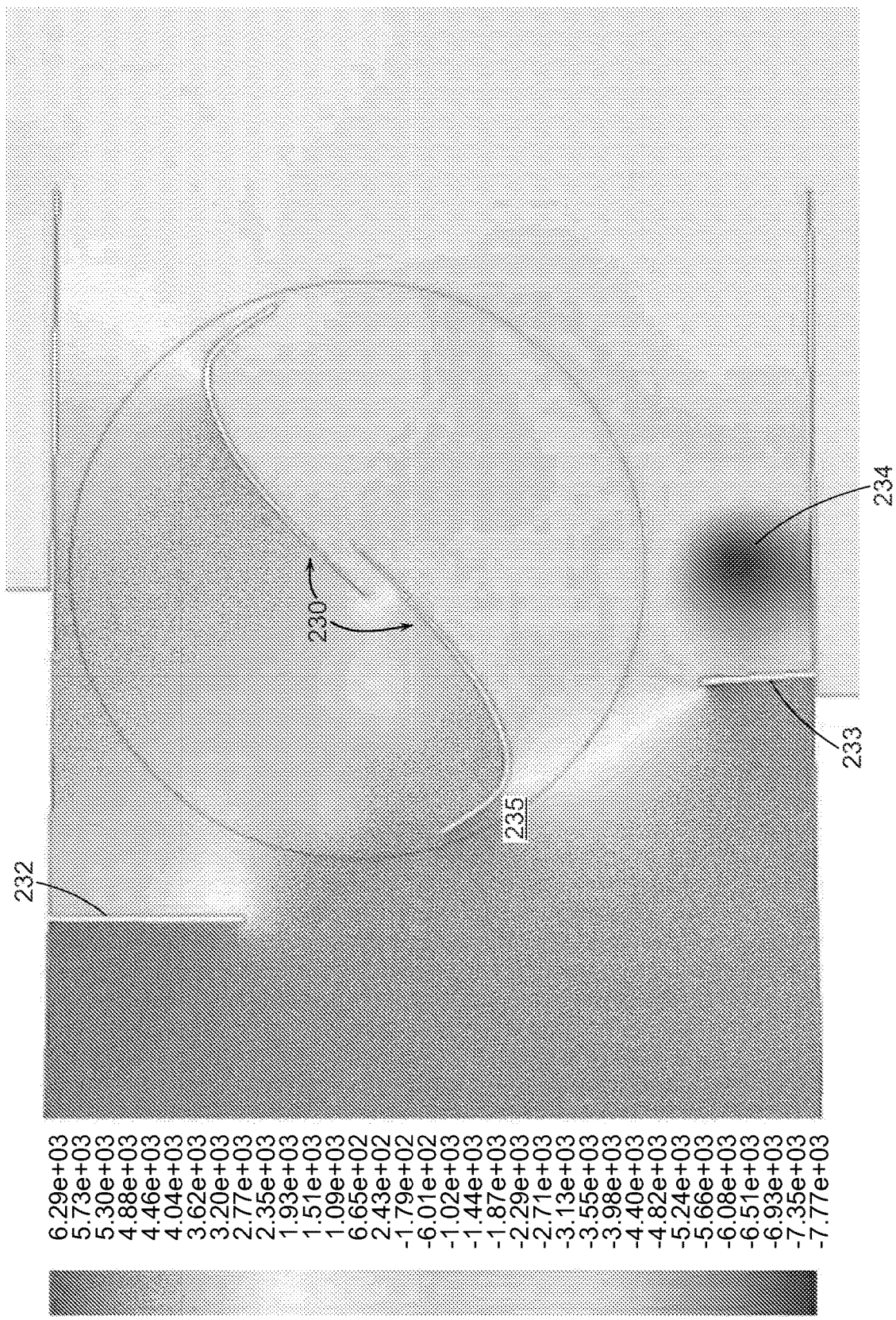
FIG. 14 is a static air pressure wind tunnel study of a housing with deflectors and a propeller in position "d."

FIG. 13 shows the distribution of pressure where air moving at 36-40 mph is directed towards a stationary propeller 230 in position "d" in a housing without deflectors. In position "d," the propeller 230 has been rotated counterclockwise by 45 degrees from position "c" shown in FIGS. 11 and 12. FIG. 14 shows the distribution of pressure under the same conditions as FIG. 13, but with deflectors 232 and 233 in the housing ahead of the propeller 230. The scales on the left side of FIGS. 13 and 14 are in pounds per square inch.

In FIG. 13, the lack of deflectors causes an area of high pressure 231 to develop, resisting the propeller's 230 rotation in the counterclockwise direction. With the addition of deflectors 232 and 233 in FIG. 14, the area of high pressure 235 is a lower pressure than without the deflectors. Behind deflector 233, an area of high pressure 234 develops, indicating the need for a third blade on the propeller 230. With a three bladed propeller (as used in the first and second embodiments), a propeller blade would be in position to use the high pressure area 234 to transmit a rotational force on the propeller 230.

Figure 15:
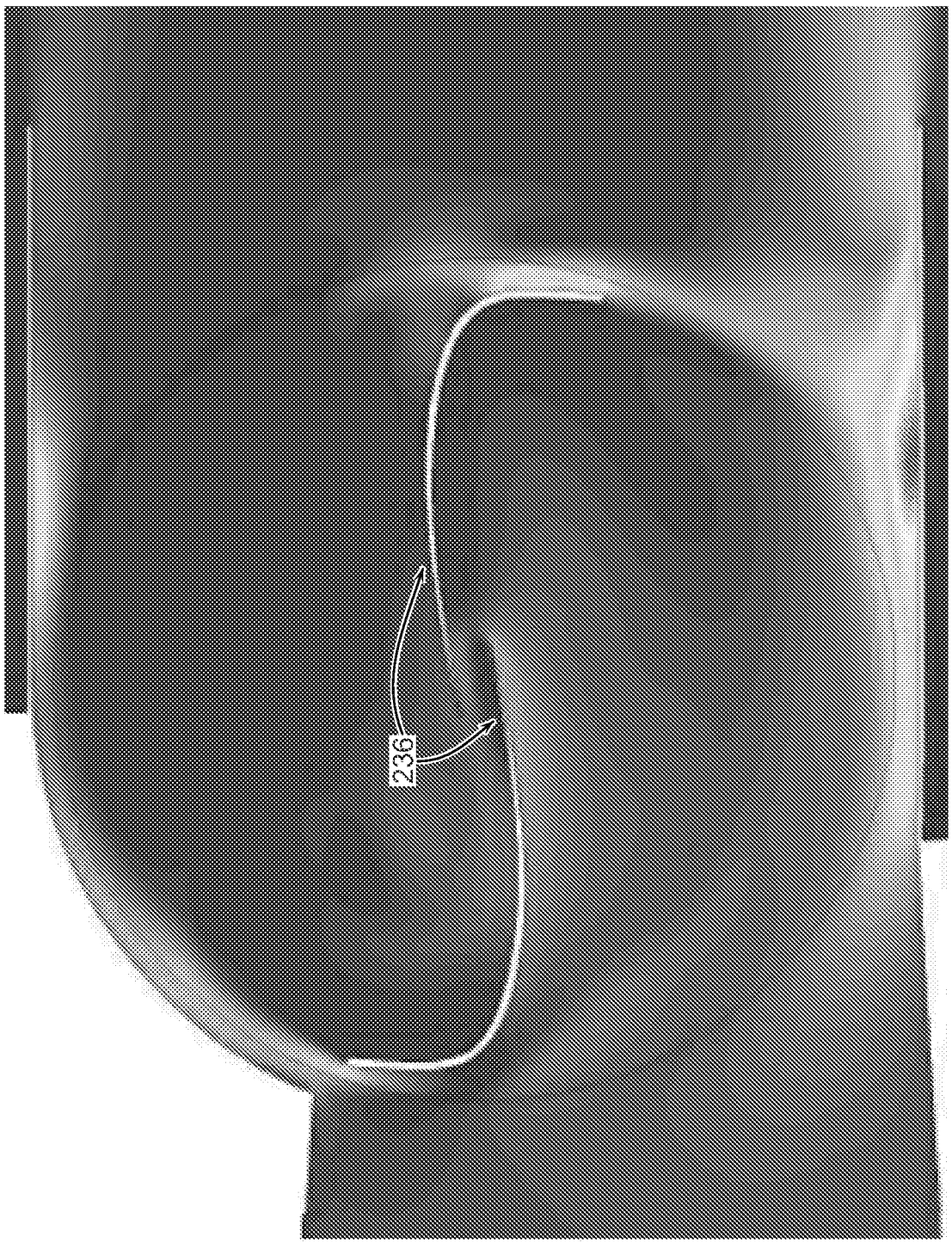
FIG. 15 is a dynamic air pressure wind tunnel study of a housing without deflectors and a propeller in position "c."
Figure 16:
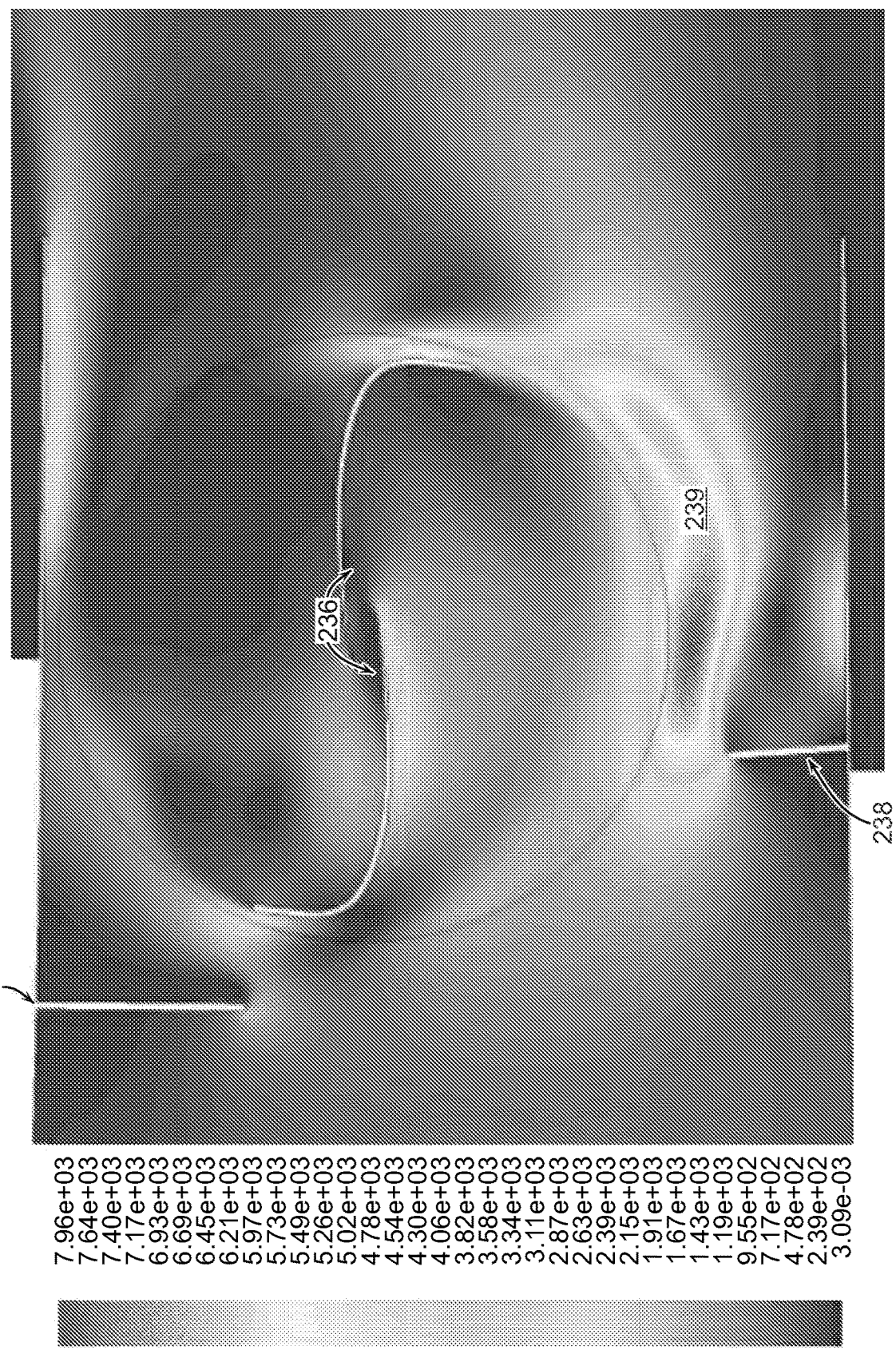
FIG. 16 is a dynamic air pressure wind tunnel study of a housing with deflectors and a propeller in position "c."

FIG. 15 shows the distribution of pressure where air moving at 36-40 mph is directed towards a rotating propeller 236 in position "c" (also shown in FIGS. 11 and 12) in a housing without deflectors. In this figure, the propeller 236 is rotating at 3,300 rpm which represents the theoretical rate of rotation for the propeller design used in the study when subjected to air moving at 40 mph. FIG. 16 shows the distribution of pressure under the same conditions as FIG. 15, but with deflectors 237 and 238 in the housing ahead of the propeller 236. In FIG. 16, an area of high pressure 239 develops, indicating the need for a third blade on the propeller 236 to use the pressure for a rotational force. The scales on the left side of FIGS. 15 and 16 are in pounds per square inch.

Figure 17:
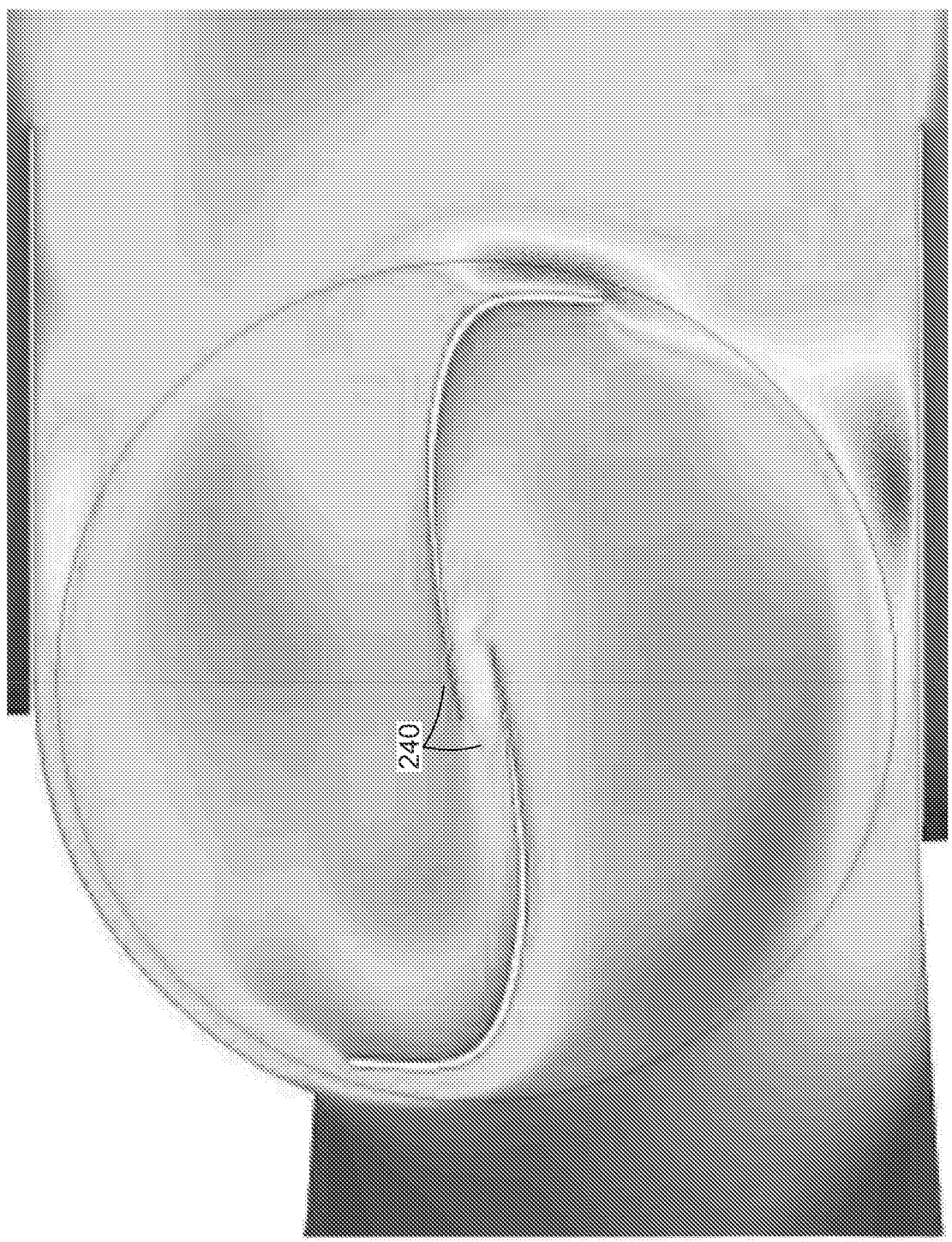
FIG. 17 is a dynamic turbulence intensity wind tunnel study of a housing without deflectors and a propeller in position "c."
Figure 18:
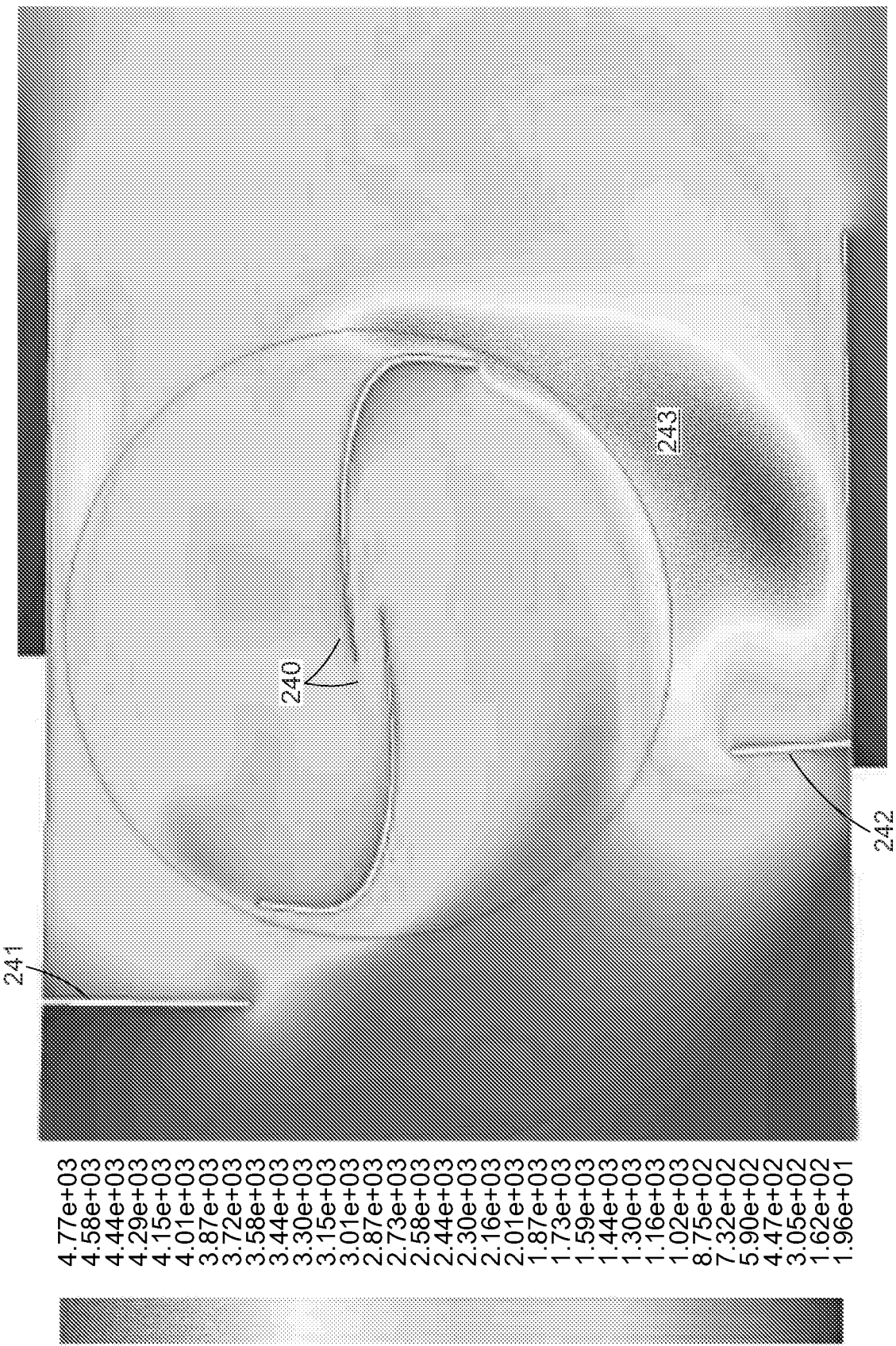
FIG. 18 is a dynamic turbulence intensity wind tunnel study of a housing with deflectors and a propeller in position "c."

FIG. 17 shows the level of turbulence intensity where air moving at 36-40 mph is directed towards a propeller 240 rotating at 3,300 rpm in position "c" (also shown in FIGS. 11, 12, 15 and 16) in a housing without deflectors. FIG. 18 shows the level of turbulence intensity under the same conditions as FIG. 17, but with deflectors 241 and 242 in the housing ahead of the propeller 240. Similar to other the other position "c" diagrams, an area of intense turbulence develops in area 243 that provides a rotational force to the two bladed propeller 240 in the diagram but would benefit from a three bladed propeller design. The scales on the left side of FIGS. 17 and 18 are in pounds per square inch.

Figure 19:
FIG. 19 is a dynamic distribution and intensity of power lines wind tunnel study of a housing without deflectors and a propeller in position "c."

FIG. 19 shows the distribution and intensity of power lines where air moving at 36-40 mph is directed towards a propeller 244 rotating at 3,300 rpm in position "c" (also shown in FIGS. 11, 12 & 15-18) in a housing without deflectors. Without deflectors, an area of intense power develops in area 245 that resists the counterclockwise rotation of the propeller 244.

Figure 20:
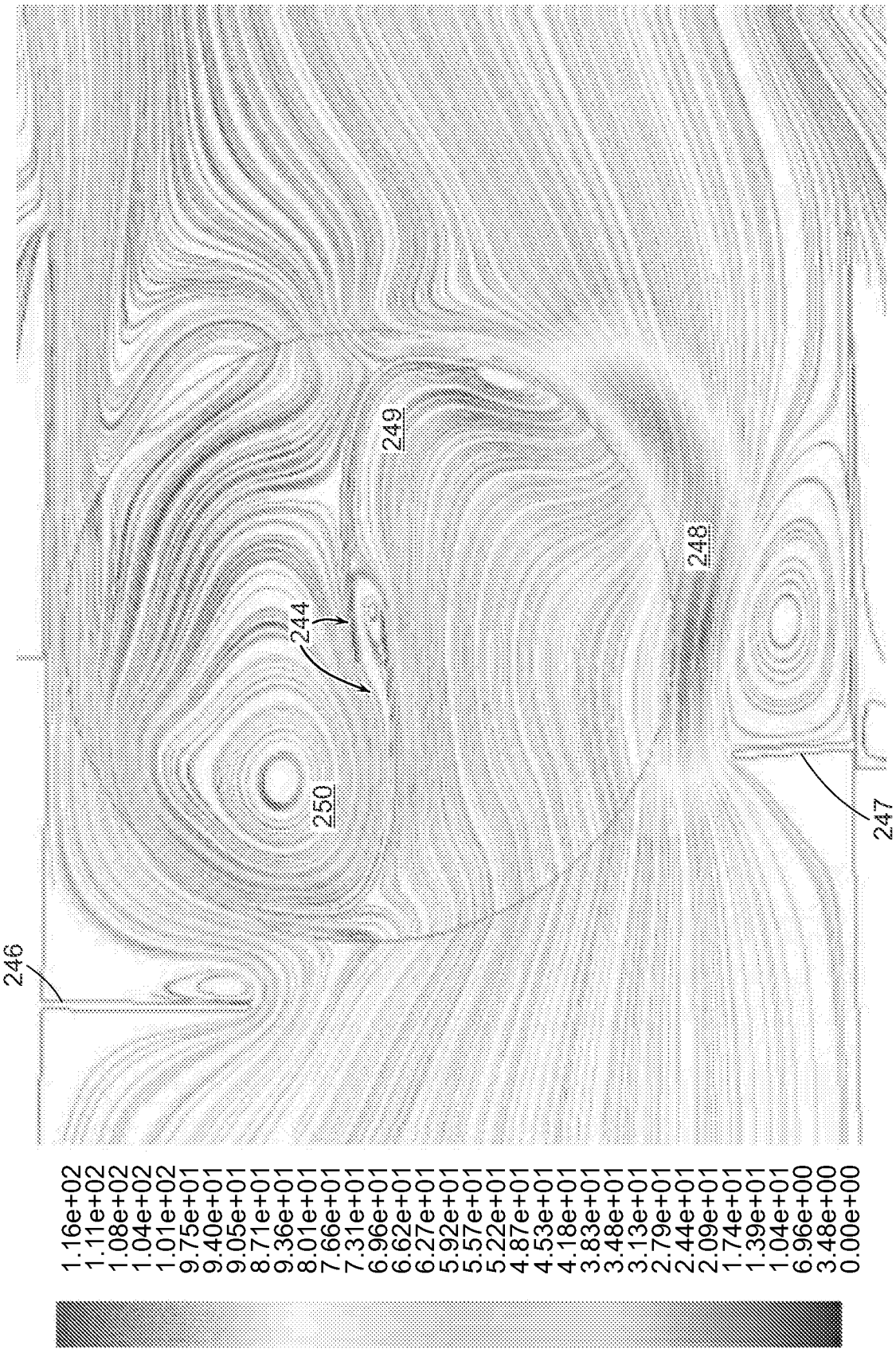
FIG. 20 is a dynamic distribution and intensity of power lines wind tunnel study of a housing with deflectors and a propeller in position "c."

FIG. 20 shows the distribution and intensity of power lines under the same conditions as FIG. 19, but with deflectors 246 and 247 in the housing ahead of the propeller 244. With the deflectors 246 and 247 in place, the area of intense power 245 in FIG. 19 does not develop. Instead, an area of intense power develops in area 248, creating a rotational force in the counterclockwise direction on the propeller 244. Because of the distance between the area of intense power 248 and the propeller 244 in position "c," a three bladed propeller would be more efficiently able to translate area 248 into a rotational force in the counterclockwise direction. The addition of the deflectors 246 and 247 also smooth the power lines along the face of the propeller 244 blades in areas 249 and 250. The scales on the left side of FIGS. 19 and 20 are in newton meters.

Figure 21:
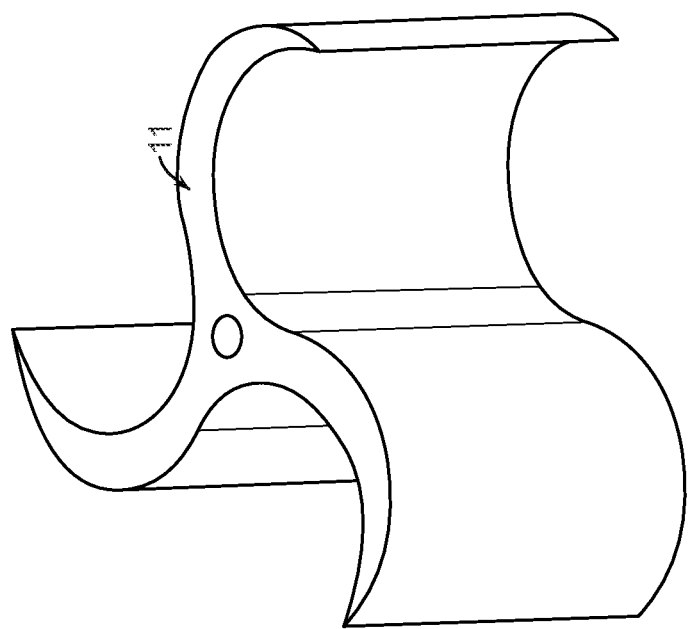
FIG. 21 is a perspective view of the propeller of the first embodiment of the invention.

FIG. 21 is a perspective view of the propeller 11 used in the first embodiment. While propellers with two or more blades can be used in the invention, the three blade design in FIG. 21 was found to be the most efficient propeller type at the design fluid density and velocity based on the wind tunnel simulation shown in FIGS. 7-20. At the design fluid density and velocity, a three blade propeller is able to use turbulence that would otherwise be expelled out of the housing past a two blade propeller design. The propeller 11 is also designed with a rounded trailing edge to allow the fluid to move in a circular pattern over the blade. While the shape of the leading edge is dictated by the shape of the trailing edge, it is smoothed to shed air from the blade tips and reduce drag.

Figure 22:
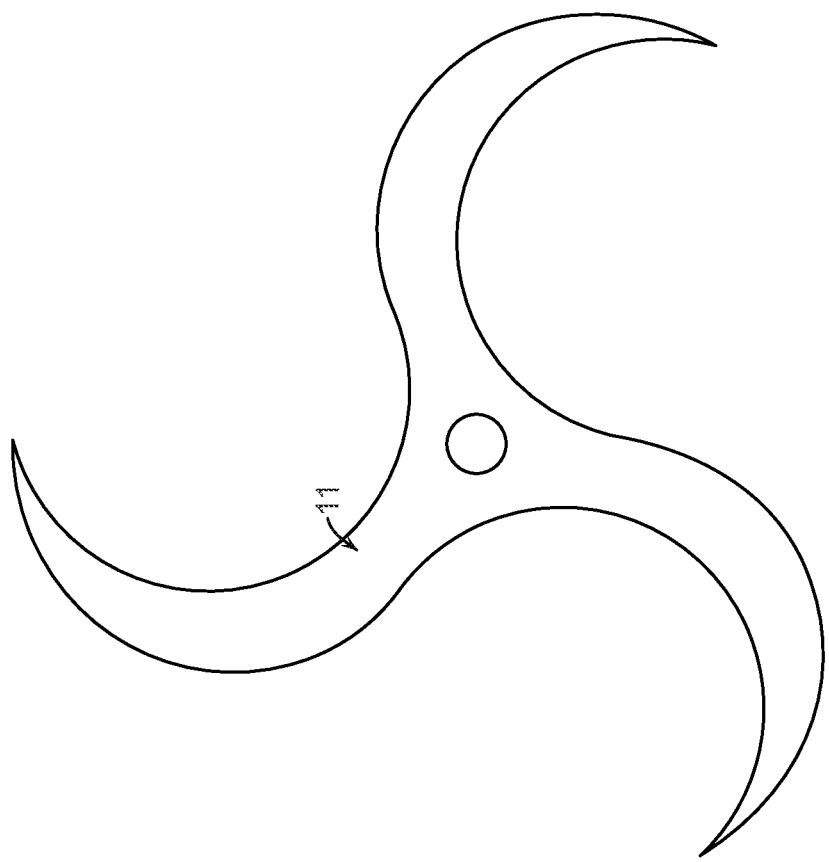
FIG. 22 is a top view of the propeller of the first embodiment of the invention.

FIG. 22 is a top view of the propeller 11 used in the first embodiment, showing the curvature of the blades. Each blade tip is 120 degrees from the adjacent blade tips.

In FIGS. 23-28 is second embodiment of the invention additionally comprising an electrical generator coupled to the propeller shaft and an air collector used to direct air towards the propeller. The second embodiment uses the principles contained in the first embodiment to generate electricity from moving air. The second embodiment is particularly useful when mounted in the empty transmission tunnel of an electric vehicle. When electric vehicles are based on the floor pan design of an internal combustion engine powered vehicle, they have an empty transmission tunnel that creates aerodynamic drag under the vehicle. When mounted in the transmission tunnel of an electric vehicle, this embodiment reduces the aerodynamic drag when compared to a bare transmission tunnel and generates electricity. When used on a vehicle powered by an internal combustion engine, this embodiment can be used to generate electricity when the vehicle is moving at speed, allowing other electrical generation devices, such as an alternator, to be decoupled for increased efficiency. It is understood that the first embodiment of this invention is capable of use in applications other than in the second embodiment described herein.

Figure 23:
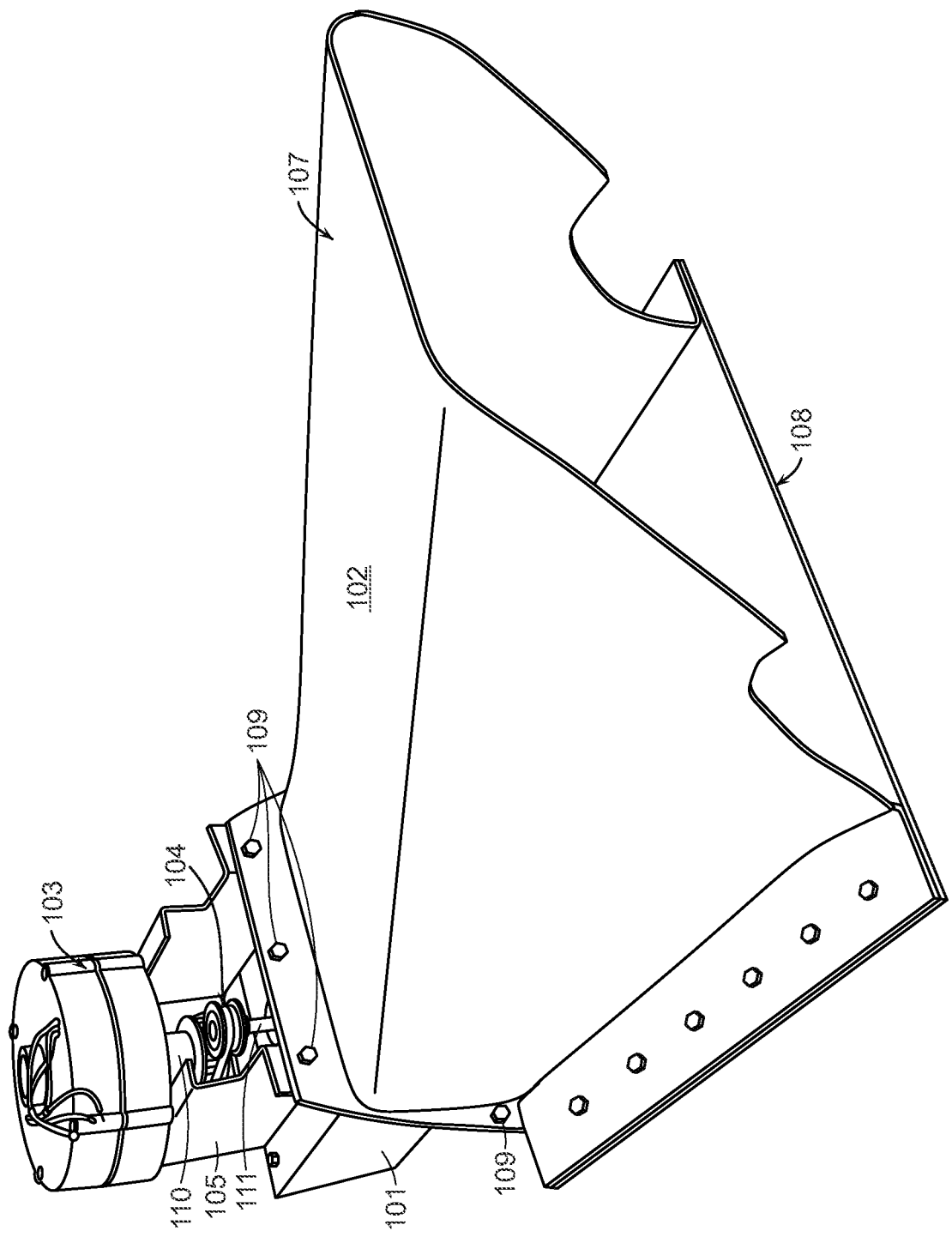
FIG. 23 is perspective view of a second embodiment of the invention.

In FIG. 23 is a perspective view of the second embodiment comprising a housing 101 with generally conical shaped air collector 102 mounted to the front of the housing and an electrical generator 103 mounted to the top of the housing using a u-shaped bracket 105. The air collector 102 has an upper shell 107 and lower panel 108 and is generally characterized as having a larger opening facing away from the housing 101 and a smaller opening fixed to the front of the housing using fasteners 109. The air collector 102 in this embodiment is designed to fit within the transmission tunnel of a vehicle, however, many variations of the air collector are possible depending on the particular application. While having a larger front opening than rear opening in the air collector is desirable when mounting the invention in the transmission tunnel of a vehicle, there are other possible applications where it would be advantageous to have an opening of the same size or smaller than the rear opening to reduce aerodynamic drag. An active shutter system or other method to control the volume and speed of the air entering the housing 101 can optionally be employed to further increase the efficiency of the invention.

The input shaft 110 of the electrical generator 103 is coupled to a belt and pulleys 104, which is in turn coupled to a rotating shaft 111 fixed to the propeller (not shown in this view). The rotating shaft 111 can rotate freely relative to the housing 101 and is mounted to the housing 101 with a bearing towards each end of the shaft. The belt and pulleys 104 allow a user to fine tune the amount resistance offered by the electrical generator 103 against the propeller's rotation. In the second embodiment, the belt and pulleys have a 2:1 ratio where two rotations of the rotating shaft 111 will cause the electrical generator to rotate once.

FIG. 24 is a side view of the second embodiment of the invention showing the profile of the air collector 102. The opposite side view is a mirror image of the side view shown in FIG. 24. The propeller (not shown) is approximately centered fore and aft in the housing 101 with the electrical generator 103 offset to the rear slightly by the bracket 105 to accommodate the reduction belt and pulleys 104 (hidden behind bracket 105).

FIG. 25 is a bottom view of the second embodiment showing the bottom of the housing 101 and air collector 102. The flat bottom panel 108 and upper curved panel 107 of air collector 102 can be seen in this view. Because this embodiment is designed to fit within the transmission tunnel of a vehicle, the upper panel 107 is curved to approximate the curvature of a transmission tunnel. The bottom panel 108 is flat to smooth the air flow underneath the vehicle. At substantially the center of the housing 101 is the bottom of the rotating shaft 111 fixed to the propeller. The rotating shaft 111 is coupled to the inner race of a bearing 113 mounted to the bottom of the housing 101.

Figure 26:
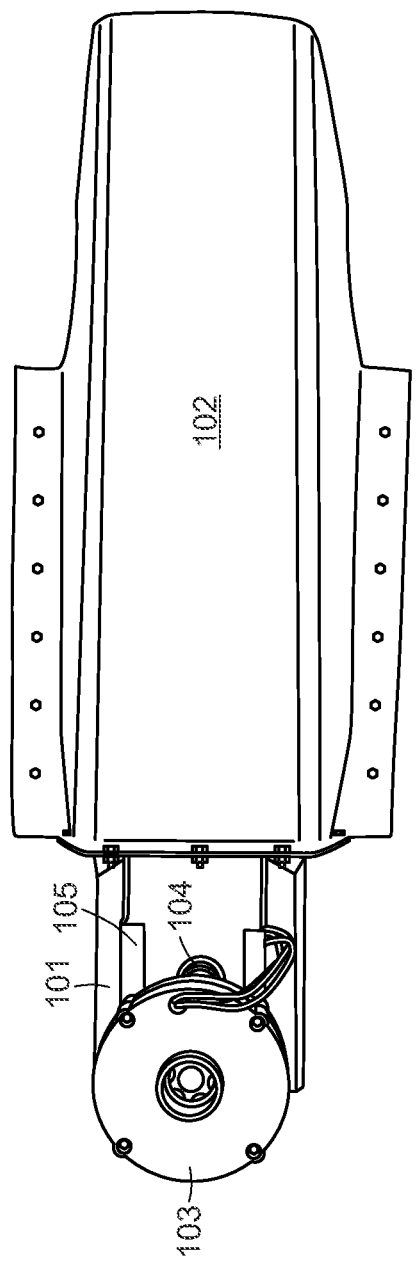
FIG. 26 is a top view of the second embodiment of the invention.

FIG. 26 is a top view of the second embodiment showing the top of housing 101, the generator 103 and the air collector 102. The electrical generator 103 is offset to the rear and mounted above housing 101 using bracket 105. The reduction belt and pulleys 104 are visible between the generator 103 and housing 101. The air collector 102 widens slightly to the front to match the contour of a typical transmission tunnel.

Figure 27:
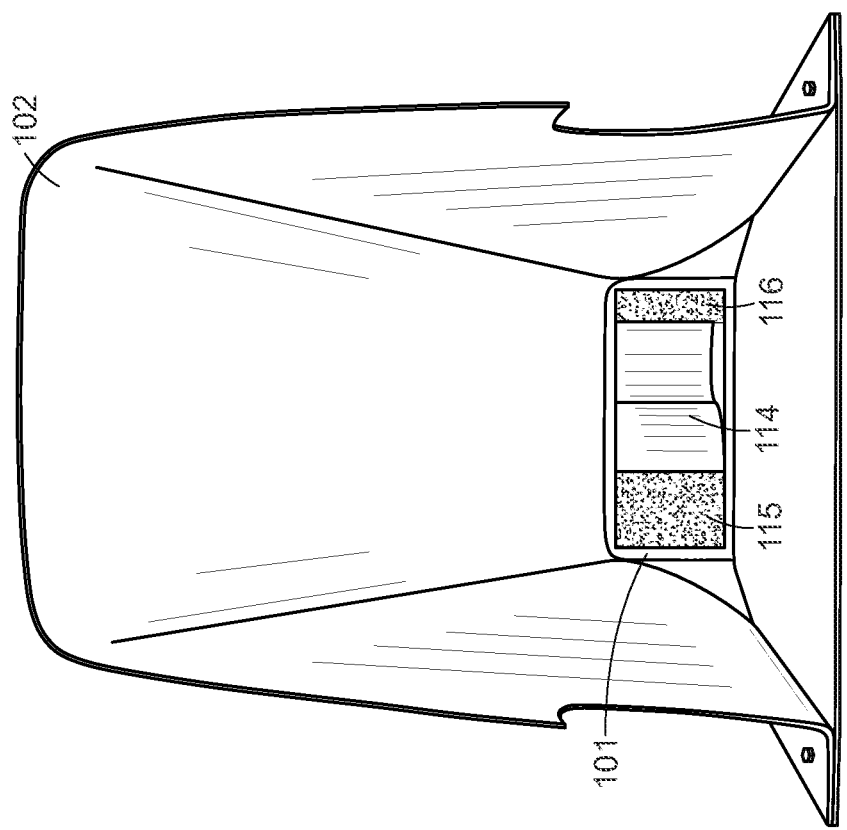
FIG. 27 is a front view of the second embodiment of the invention.

FIG. 27 is a front view of the second embodiment showing the taper of the air collector 102 and the components mounted inside housing 101. The components mounted inside housing 101 are designed using the same principles explained in the first embodiment. Mounted in the center of housing 101 is a vertical axis three blade propeller 114 of substantially the same shape as the propeller disclosed in FIGS. 21 and 22, scaled for the specific application. Mounted in front of the propeller are a first deflector 115 and a second deflector 116 of substantially the same shape as those used in the first embodiment and used to generate the turbulent flow described in the first embodiment.

Figure 28:
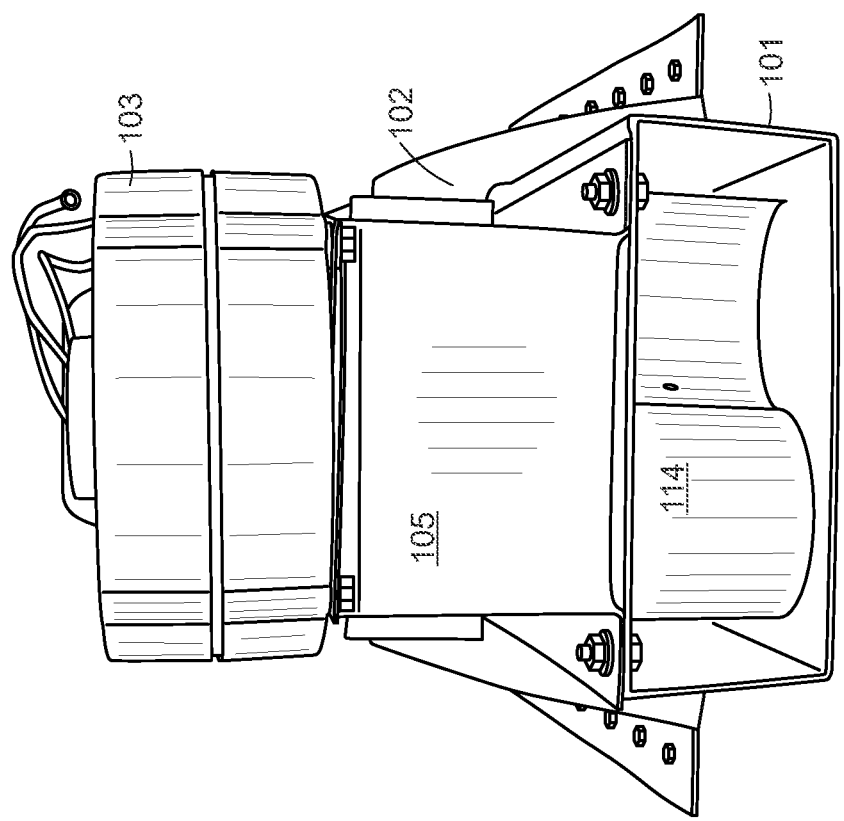
FIG. 28 is a rear view of the second embodiment of the invention.

FIG. 28 is a rear view of the second embodiment showing the rear opening of the housing 101 and the rear detail of the electrical generator 103 mounting bracket 105. The air collector 102 can be seen in this view as it is wider at its front than the front opening to the housing 101.

What has been described is a vertical axis wind turbine for the generation of electricity from moving air. While this disclosure shows the invention as an electric generator, all or part of the invention is capable of being used in other applications and in other fluids. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

The invention claimed is:

1. A wind turbine comprising:
a housing with a first opening and a second opening, where a fluid enters said housing through said first opening and exits through said second opening;
a shaft rotatably mounted within said housing;
a propeller fixed to said shaft;
wherein the propeller comprises three blades spaced 120 degrees apart;
wherein the three blades define a swept area of the propeller;
a first obstruction and a second obstruction fixed to the housing between the first opening and the propeller;
wherein the first obstruction and second obstruction comprise a flat surface in a direction normal to a direction of fluid flow;
wherein the first obstruction and second obstruction comprise a proximate end fixed to the housing and a distal end terminating towards the swept area of the propeller;
wherein the distal end of the first obstruction comprises a flat surface parallel to a line tangent to a closest point on the swept area to the distal end of the first obstruction,
wherein the distal end of the second obstruction comprises a flat surface parallel to a line tangent to a closest point on the swept area to the distal end of the second obstruction; and
wherein the point on the swept area closest to the distal end of the first obstruction is 120 degrees apart from the point on the swept area closest to the distal end of the second obstruction.

2. The wind turbine of claim 1 wherein said shaft is oriented with a vertical axis.

3. The wind turbine of claim 1 further comprising an electric generator coupled to said shaft.

4. The wind turbine of claim 1 wherein said first obstruction and second obstruction are configured to introduce turbulence into the flow of a fluid.

5. The wind turbine of claim 1 wherein said first obstruction and second obstruction are configured to increase an amount of turbulence in the flow of a fluid.

6. The wind turbine of claim 1 wherein said first obstruction has a length measured in a direction normal to the flow of a fluid and said second obstruction has a length measured in the direction normal to the flow of a fluid; and wherein the length of the first obstruction is two times the length of said second obstruction.

7. The wind turbine of claim 1 wherein said wind turbine further comprises an air collector fixed to the first opening of the housing; wherein the air collector comprises two openings, a first opening of the air collector that is fixed to the first opening of the housing and a second opening of the air collector with a larger opening area than the first opening; and wherein the air collector consists of a flat bottom and an upper portion.

* * * * *